US009088926B2

(12) United States Patent
Liu et al.

(10) Patent No.: US 9,088,926 B2
(45) Date of Patent: Jul. 21, 2015

(54) RELAY NODE INTERFACE RELATED LAYER 2 MEASUREMENTS AND RELAY NODE HANDLING IN NETWORK LOAD BALANCING

(71) Applicant: INTERDIGITAL PATENT HOLDINGS, INC., Wilmington, DE (US)

(72) Inventors: Kai Liu, S. Huntington, NY (US); Peter S. Wang, E. Setauket, NY (US); Nobuyuki Tamaki, Melville, NY (US); Janet A. Stern-Berkowitz, Little Neck, NY (US); Stephen E. Terry, Northport, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 13/896,800

(22) Filed: May 17, 2013

(65) Prior Publication Data

US 2013/0250918 A1    Sep. 26, 2013

Related U.S. Application Data

(63) Continuation of application No. 13/289,571, filed on Nov. 4, 2011, now Pat. No. 8,467,351.

(60) Provisional application No. 61/430,745, filed on Jan. 7, 2011, provisional application No. 61/410,633, filed on Nov. 5, 2010.

(51) Int. Cl.
*H04W 36/30* (2009.01)
*H04W 36/00* (2009.01)
(Continued)

(52) U.S. Cl.
CPC .......... *H04W 36/30* (2013.01); *H04W 36/0094* (2013.01); *H04W 24/10* (2013.01); *H04W 36/22* (2013.01); *H04W 84/047* (2013.01)

(58) Field of Classification Search
CPC ..... H04W 36/30; H04W 24/10; H04W 36/22; H04W 84/047
USPC .......................................... 370/331, 332, 274
See application file for complete search history.

(56) References Cited

U.S. PATENT DOCUMENTS 8,260,297 B2   9/2012  Jeong et al.
8,289,928 B2  10/2012  Lee et al.
(Continued)

FOREIGN PATENT DOCUMENTS

RU          2264694 C2    11/2005
WO    WO 2009115554 A1    9/2009
(Continued)

OTHER PUBLICATIONS

3rd Generation Partnership Project (3GPP), R2-105385, "Impacts on L2 Measurements", CATT, 3GPP TSG RAN WG2 Meeting #71bis, Xi'an, China, Oct. 11-15, 2010, 1-2.
(Continued)

*Primary Examiner* — Mohammad Anwar
(74) *Attorney, Agent, or Firm* — Condo Roccia Koptiw LLP

(57) ABSTRACT

A method for performing radio usage measurements to support radio link operations and/or load balancing may be performed at an evolved Node B (eNB). The method may include determining a first radio usage parameter. The first radio usage parameter may be a measurement of radio usage between an eNB and at least one wireless transmit receive unit (WTRU). The method may further include determining a second radio usage parameter. The second radio usage parameter may be a measurement of radio usage between the eNB and at least one relay node (RN) served by the eNB. The method may further include utilizing at least one of the first radio usage parameter or the second radio usage parameter to evaluate at least one of evolved universal terrestrial radio access (E-UTRA) radio link operations, radio resource management (RRM), network operations and maintenance (OAM), and self-organizing networks (SON) functions or functionalities.

20 Claims, 9 Drawing Sheets

(51) Int. Cl.
  *H04W 24/10* (2009.01)
  *H04W 36/22* (2009.01)
  *H04W 84/04* (2009.01)

(56) References Cited

U.S. PATENT DOCUMENTS

| | | | |
|---|---|---|---|
| 2003/0134640 | A1 | 7/2003 | Kim et al. |
| 2008/0267127 | A1* | 10/2008 | Narasimha et al. ............ 370/331 |
| 2010/0142488 | A1* | 6/2010 | Zhang et al. ................... 370/332 |
| 2010/0316096 | A1 | 12/2010 | Adjakple et al. |
| 2010/0329216 | A1* | 12/2010 | Jen ................................. 370/332 |
| 2011/0080890 | A1* | 4/2011 | Cai et al. ........................ 370/331 |
| 2011/0081903 | A1* | 4/2011 | Cai et al. ........................ 455/424 |
| 2011/0275361 | A1 | 11/2011 | Yavuz et al. |

FOREIGN PATENT DOCUMENTS

| | | |
|---|---|---|
| WO | WO 2010004295 A2 | 1/2010 |
| WO | WO 2010031436 A1 | 3/2010 |
| WO | WO 2010121661 A1 | 8/2010 |

OTHER PUBLICATIONS

3rd Generation Partnership Project (3GPP), R2-105722, "RRC Connection Release on Un Interface", LG Electronics Inc., 3GPP TSG-RAN WG2 #71bis, Xi'an, China, Oct. 11-15, 2010, 1-2.

3rd Generation Partnership Project (3GPP), R3-102911, "Mobility Load Balancing in Case of Relay Nodes", Qualcomm Incorporated, 3GPP TSG-RAN WG3 #69bis, Xi'an, China, Oct. 11-15, 2010, 1-2.

3rd Generation Partnership Project (3GPP), Tdoc R2-073371, "eNB Measurements—L2 Measurements", NTT DoCoMo, KPN, Orange, Telecom Italia, Telefonica, T-Mobile, Vodafone, 3GPP TSG RAN WG2 #59, Athens, Greece, Aug. 20-24, 2007, 1-7.

3rd Generation Partnership Project (3GPP), Tdoc R2-105369, "Handling Load Re-Balancing for RN Deployment", Potevio, 3GPP TSG-RAN WG2 #71bis, Xi'an, China, Oct. 11-15, 2010, 3 pages.

3rd Generation Partnership Project (3GPP), TS 36.216 V1.0.0, "Technical Specification Group Radio Access Network, Evolved Universal Terrestrial Radio Access (E-UTRA), Physical Layer for Relaying Operation (Release 10)", Sep. 2010, 1-12.

3rd Generation Partnership Project (3GPP), TS 36.314 V9.1.0, "Technical Specification Group Radio Access Network, Evolved Universal Terrestrial Radio Access (E-UTRA), Layer 2-Measurements (Release 9)", Jun. 2010, 1-17.

3rd Generation Partnership Project (3GPP), TS 36.314 V10.0.0, "Technical Specification Group Radio Access Network, Evolved Universal Terrestrial Radio Access (E-UTRA), Layer 2-Measurements (Release 10)", Dec. 2010, 1-17.

3rd Generation Partnership Project (3GPP), TS 36.423 V9.4.0, "Technical Specification Group Radio Access Network, Evolved Universal Terrestrial Radio Access Network (E-UTRAN), X2 Application Protocol (X2AP) (Release 9)", Sep. 2010, 1-121.

\* cited by examiner

RELAY NODE INTERFACE RELATED LAYER 2 MEASUREMENTS AND RELAY NODE HANDLING IN NETWORK LOAD BALANCING

CROSS REFERENCE TO RELATED APPLICATIONS

This application is a continuation of U.S. patent application Ser. No. 13/289,571, filed Nov. 4, 2011; which claims the benefit of U.S. Provisional Patent Application No. 61/410,633 filed Nov. 5, 2010 and U.S. Provisional Patent Application No. 61/430,745 filed Jan. 7, 2011, the contents of which are hereby incorporated by reference herein.

BACKGROUND

Long Term Evolution (LTE) evolved packet core (EPC) network management functions may provide mobility management gateway (MME) load balance capabilities to offload an MME, for example when the MME is congested or is to be powered off for maintenance. Load balancing allows the network to maintain its normal operations on the network side and to maintain smooth interactions with respect to the radio access network or to the user terminals.

In Release-8, the MME load balancing (re-balancing) functionality may permit subscribers/UEs that are registered on an MME (e.g., within an MME Pool Area) to be moved to another MME. For example, a network operations and management (OAM) function may remove one of the MMEs from an MME pool area. In that aspect as well as a general case, the subscribers may be off-loaded as soon as possible to generate minimal impact on network and the user's experience. Measurements may be performed in order to determine load conditions at an evolved Node B (eNB). The measurements may not differentiate for types of radio connections at the eNB.

SUMMARY

A method for performing radio usage measurements to support radio link operations and/or load balancing is disclosed herein. The method may include determining a first radio usage parameter. The first radio usage parameter may be a measurement of radio usage between an evolved Node B (eNB) and at least one wireless transmit receive unit (WTRU). The first radio usage measurement may be a Layer 2 (L2) measurement for traffic on a Uu interface of the eNB. The eNB may be referred to as a donor eNB (DeNB). The method may further include determining a second radio usage parameter. The second radio usage parameter may be a measurement of radio usage between the eNB and at least one relay node (RN) served by the eNB. The second radio usage measurement may be an L2 measurement for traffic on a Un interface of the DeNB. The method may further include utilizing at least one of the first radio usage parameter or the second radio usage parameter to evaluate at least one of evolved universal terrestrial radio access (E-UTRA) radio link operations (e.g., support Uu interface and/or Un interface operation), radio resource management (RRM) (e.g., repartitioning of Uu and/or Un radio resources), network operations and maintenance (OAM) (e.g., for OAM performance observability), and self-organizing networks (SON) functions or functionalities (e.g., RN/WTRU handover and/or RN connection maintenance). The method may be performed at the eNB.

Example L2 measurements that may be performed on at least one of a Uu interface or Un interface may include, but are not limited to, one or more of: downlink (DL) physical resource block (PRB) usage, uplink (UL) PRB usage, DL PRB usage per Quality of Service (QoS) class indicator (QCI), UL PRB usage per QCI, actual total load condition, PRB usage per Un Subframe Configuration (UnSC), macro-WTRU PRB usage in Un subframes, RN PRB usage in Un subframes, other measurements indicating PRB usage at the DeNB, an estimation of the number of active WTRUs under a DeNB per QCI, DL packet delay measurements, DL data discard measurements, DL data loss measurements, or UL data loss measurements per QCI. Packet processing and transmission delay measurements may be performed per QCI at the RN. Measurements performed at the RN may be signaled to the DeNB.

Disclosed herein are methods and systems for achieving network load balancing and retrieving and using network interface related measurements. In an example, a method for managing network overloading includes detecting MME overload associated with a donor eNB serving a relay node. The method may also include rejecting attach requests originating from user equipment served by the relay node in response to detecting the overload. In the alternative or in addition to rejecting attach requests, the method may include sending an overload start message to the relay node for implementing an overload control procedure in response to detecting the overload. The method may include implementing, at the donor eNB, an overload control procedure in response to detecting the overload.

A method for handing over a RN from a source eNB to a target eNB may be performed. The method may include determining to handover the RN. The method may further include sending a handover command to the RN. The method may further include sending bearer context information to the target eNB. The bearer context information may include information that allows the target eNB to accept the RN while at least one WTRU connected to the RN remains in the connected state throughout the handover.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application.

Figure 1A:
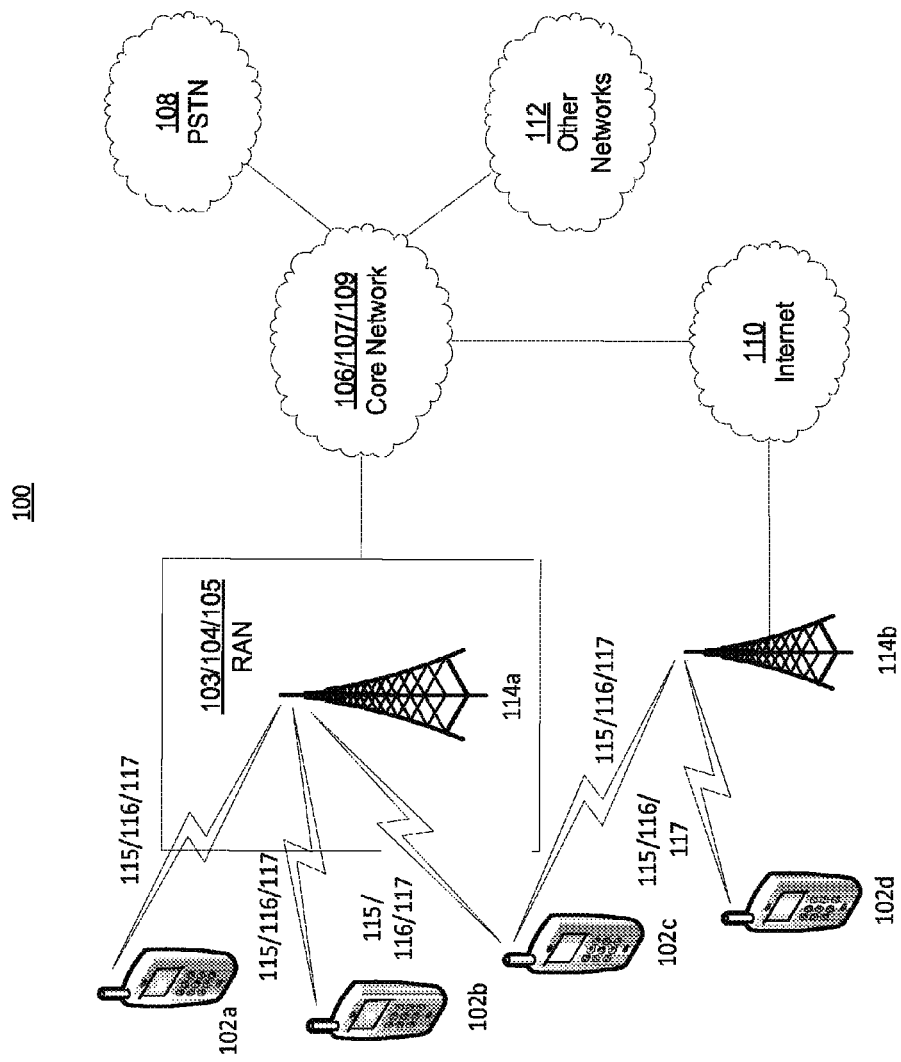
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
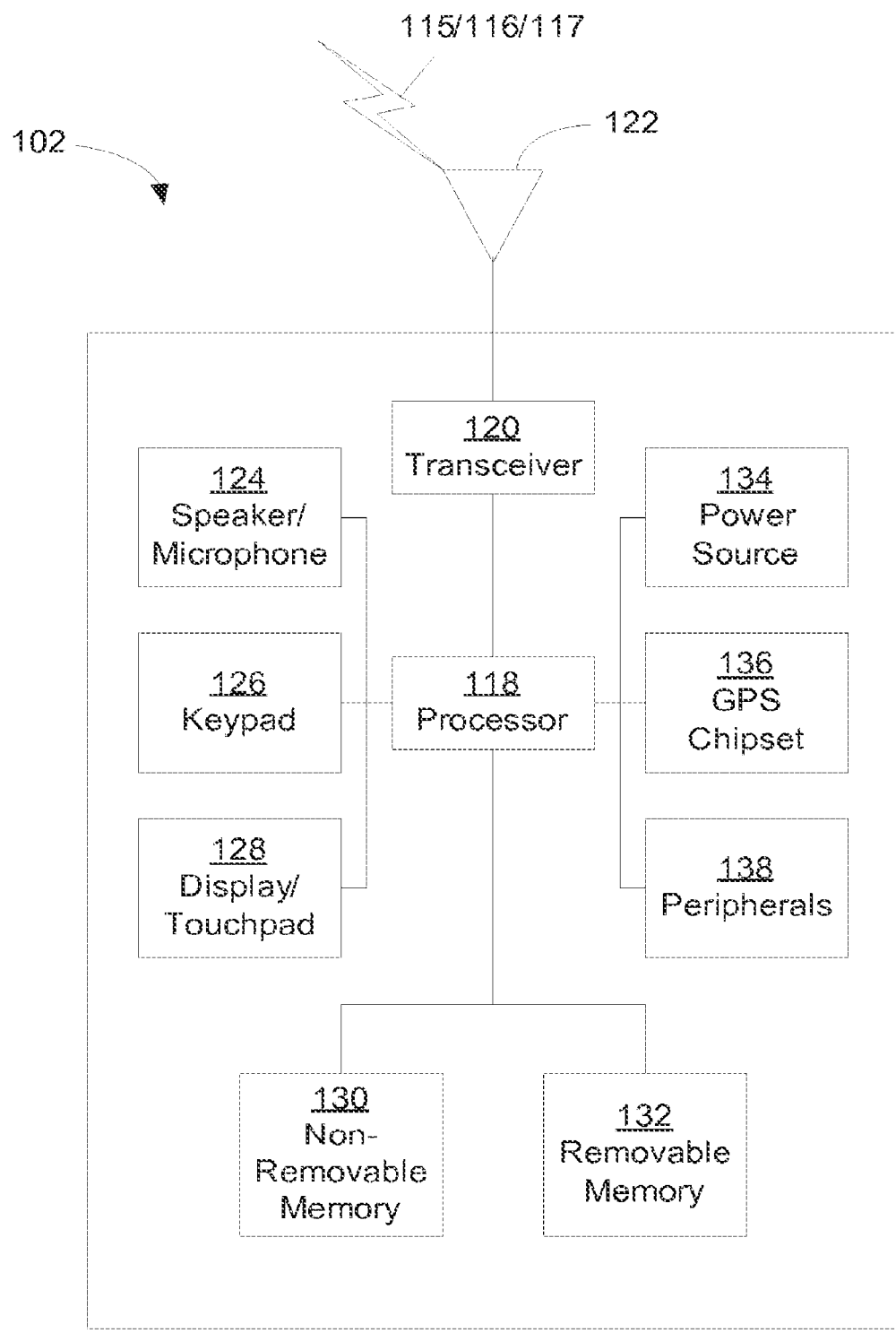
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
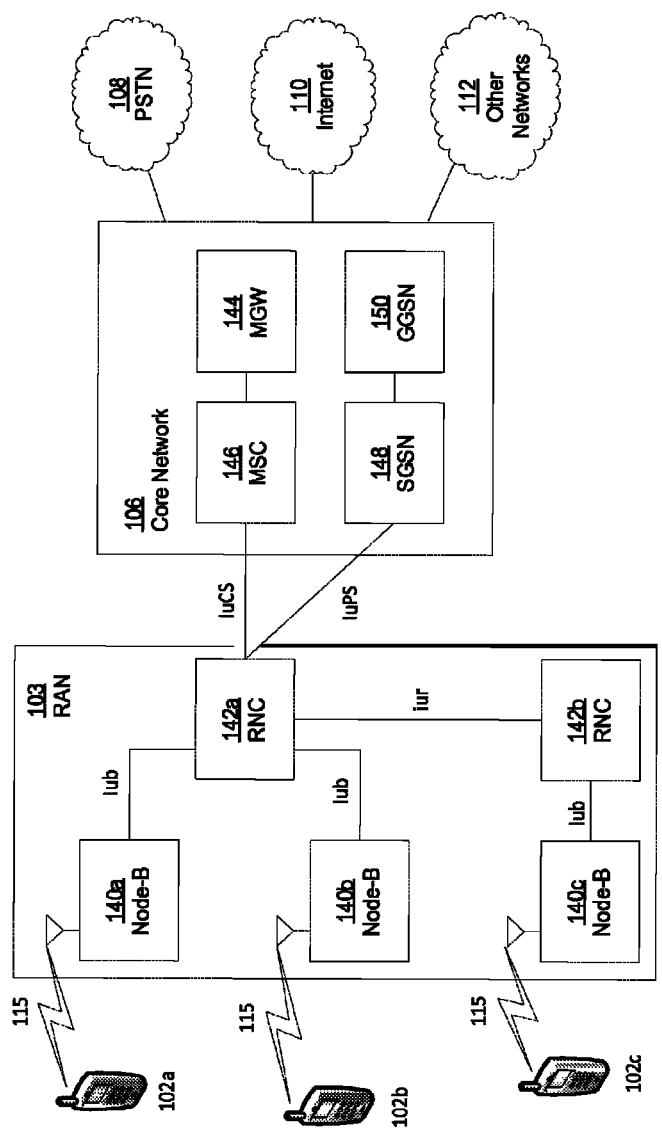
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
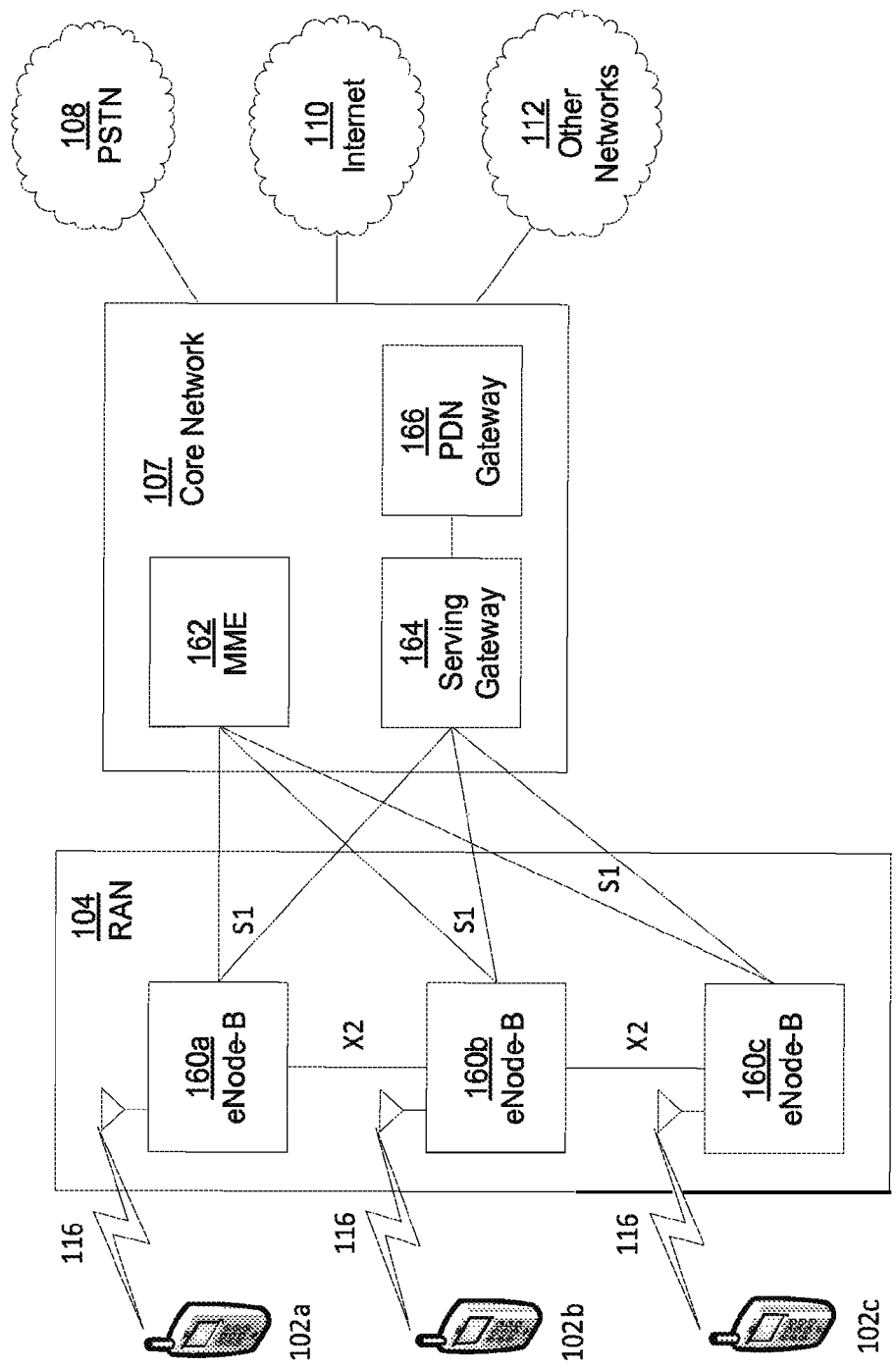
FIG. 1D is a system diagram of an another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
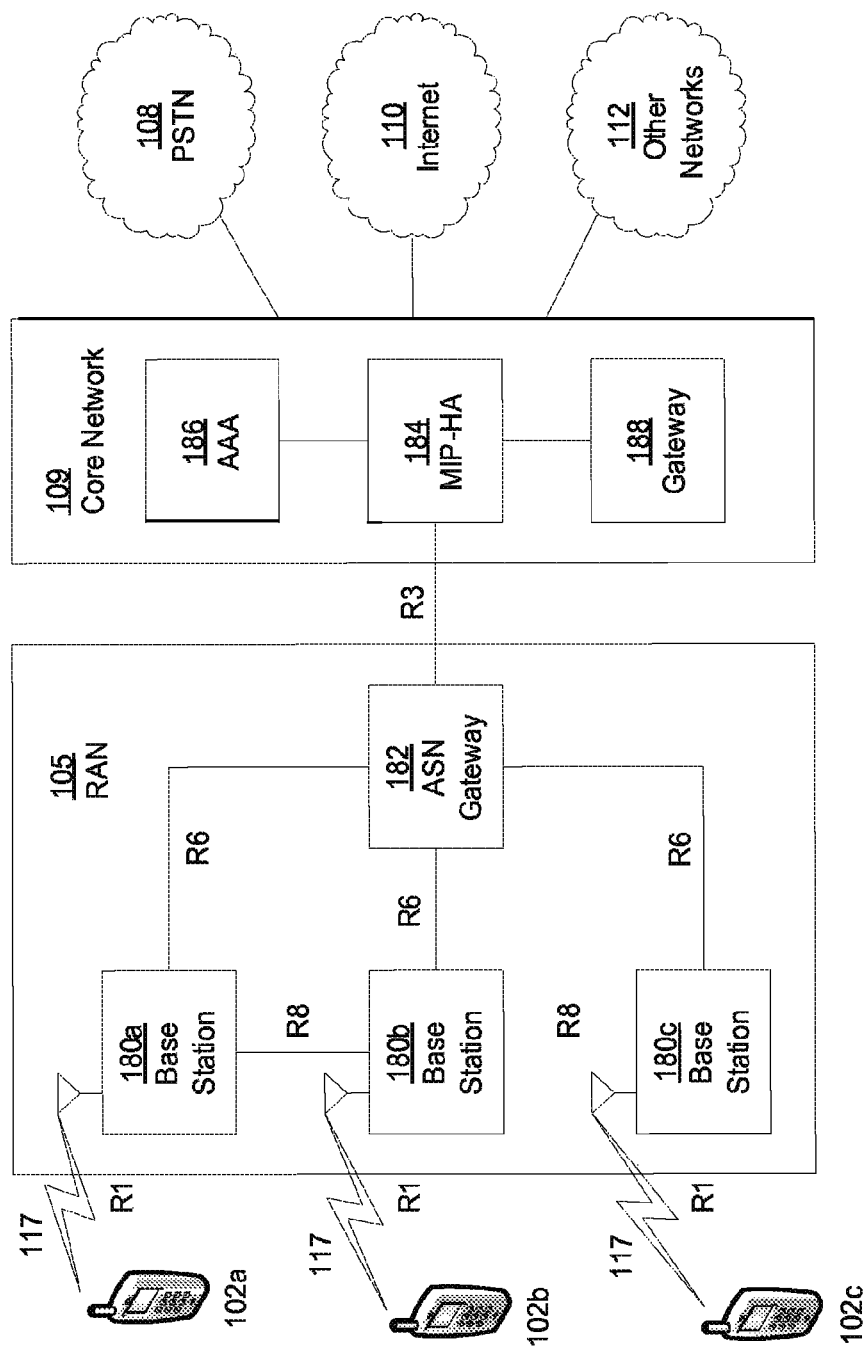
FIG. 1E is a system diagram of an another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

As the number of users of wireless cellular networks continues to increase, several techniques have been proposed to provide for added capacity of radio access networks (RANs). One such example is the deployment of relay nodes (RNs). A relay node may be deployed within a cell (e.g., near a cell boundary or other low coverage area) in order to provide additional coverage for the cell. The relay node may be a type of base station that is connected to the core network via another base station (e.g., an eNB). The connection from the RN to the core network may be referred to as a backhaul connection. As the RN may connect to the core network via an eNB over an air interface, the connection may be referred to as a wireless backhaul. An eNB that provides a wireless backhaul for RNs may be referred to as a donor eNB (DeNB).

A DeNB may provide a type of proxy functionality. For example, the DeNB may serve as an interface between the RN and an MME/the Core Network (CN). In an example, a DeNB may establish a S1 interface with the MME on behalf of the RN. The DeNB may provide gateway-like functionality for the RN, for example creating sessions and managing EPS bearers for the RN. From the perspective of the RN, the DeNB may appear as both an MME (e.g., with an S1 interface) and as an eNB (e.g., with an X2 interface). From the point of view of the DeNB, the RN may appear to function as a WTRU/UE. For example, the RN may request to be scheduled, receive UL and/or DL grants, send and receive control signaling to the core network, and/or the like. Additionally, the RN may also appear as an eNB to the DeNB. An RN may provide a radio access interface for WTRUs to connect to the core network. For example, from the perspective of a WTRU connected to the RN, the RN may appear to be an eNB and/or a cell that is distinct from the cells provided by the DeNB.

An RN may include at least two physical layer entities—one for communicating with UEs (e.g., the RN is acting as a eNB for RN-WTRUs) and one for communicating with the DeNB (e.g., for the wireless backhaul). Time-frequency resources for communications to and from an RN may be partitioned by time multiplexing eNB-RN transmissions and RN-WTRU transmissions. Subframes during which DeNB-RN transmission may take place may be configured by higher layers (e.g. layers above the physical layer). Subframes during which DeNB-RN transmission may take place may be referred to as Un subframes. The Un interface may mean communications between the RN and the DeNB during Un subframes.

Given the RN deployment in Release-10 or beyond, a MME supporting one or more RN(s) may be overloaded. For example, a RN may have more activities on RN's S1 connection than traditional WTRUs. In order to alleviate the congestions, one or more RNs may be offloaded from a particular MME. For example, an overloaded MME providing signal connections to one or more RNs, the MME may offload an RN with higher activity level of that RN's S1 connections. In an example, if an MME is to be removed from the MME pool by network operations and maintenance (OAM), subscribers serviced by the MME may be released, and the subscribers may include one or more RN(s). For purposes of explanation, an MME serving one or more RNs may be referred to as an RN-MME. There may be multiple types of Un subframe configurations (UnSC). For example, eight (8) Un subframe configurations may be defined for transmissions between a DeNB and an RN.

When an RN-MME performs load re-balancing and determines to off-load a RN, the RN-MME may send a "RN context release" message to a DeNB serving the RN. For example, the RN context release message may include a release cause such as "load balancing TAU required" to the DeNB. The RN context release message may command the release of the RN S1 context in DeNB. The DeNB may release the RN's radio resource control (RRC) connection by sending a RRC connection release message with a similar cause.

After receiving the release message, the RN may release the RRC connection and/or its Un configuration. The RN may reselect to the original DeNB for a reconnection and initiate a tracking area update (TAU) procedure. For example, the TAU procedure may be performed without changing the PGW for the subscribers connected to the RN and the RN. The RN may initiate the TAU procedure without indicating the previously registered MME (e.g., the MME that may have been overloaded/removed from service). The RN may request that the DeNB to selecting a different MME for the RN. The RN may then register with the new MME. Hence, the RN may be offloaded from one MME and connected to another. The RN may resume EPS bearers after the TAU procedure is completed, and the RN has begun to operate directly with the new MME.

When the RN is to be released for load re-balancing reasons, it may be a goal to allow WTRUs connected to the RN to remain in an active or connected state. For example, the decision whether/how long to maintain the WTRUs and the WTRU contexts in a DeNB/RN may be varied, and the connectivity of a WTRU to a RN may be affected by the transition.

Similarly, the E-UTRAN may also be overloaded for various reasons (e.g., the E-UTRAN radio resource usage exceeds its established capacity and/or an S1 link capacity for a DeNB serving the RN may be impacted for some reason). In this example, the E-UTRAN may determine to offload the WTRUs and other nodes that are attached and/or are generating traffic on the E-UTRAN. When RN(s) are deployed to E-UTRANs, the RN and/or its serviced WTRUs may be offloaded from a current DeNB to another DeNB.

Since the RN may connect to the DeNB via a Un interface using the same radio protocols and procedures as a WTRU connecting to an eNB, DeNB may use an RRC connection release procedure to release the RRC connection to the RN for load balancing between MMEs and/or E-UTRANs. The Un interface may serve as both the wireless backhaul for the RN and may be configured by an OAM. RRC signaling may be used to configure/re-configure a Un interface/Un subframe configuration.

An RN may attempt to reconnect to one of a plurality of preconfigured cells of one or more DeNBs. These cells may be considered a DeNB whitelist (DeNB-list) for the RN. If the RN is to be reconnected to one of the preconfigured cells, the offloading DeNB may be unaware of the DeNB-list members for the RN. The DeNB may be unable to construct a proper redirection information element (IE) for release and redirection of the RN. Different options may exist, for example depending on whether the DeNB has identified any of the eNBs/cells on the DeNB-list for the RN. For example, the RN may be released from a DeNB cell without the redirect info, but the RRC Connection Release message may be include a cause that indicates the purpose of the release (e.g., 'DeNB-loadbalancing'). In this example, the RN may reselect to one of the preconfigured cells on the DeNB-list, however, it may determine to not reselect to a cell served by the DeNB cell that has released the RN. In an example, the redirect information for one or more preconfigured cells for the RN may be obtained by the DeNB from the CN and/or from the RN. The redirect information may be included in the RRC Connection Release message sent to the RN. The RN may reselect to one of the preconfigured cells. The RN may determine not to reselect to a cell served by the previous DeNB that released the RN.

In the above scenarios, the RN may be released from the DeNB, and the DeNB may determine whether to maintain the WTRUs and their contexts in DeNB/RN. Even in the redirection release scenario, the RN may reselect to a different DeNB, which may be an unfavorable condition for maintaining the live RN-WTRUs and the keeping active contexts for the connected WTRUs.

Along with load balancing functionalities of the MME, an MME may also avoid signaling overload scenarios by commanding eNB(s) connected to it to restrict further signaling access by WTRUs attempting to attach to eNB(s). An MME deemed to be under overload conditions signals to selected eNBs (e.g., the eNBs may be selected randomly or based on a predefined criteria such as current load, active connections, other MME loads, and/or the like) to start and/or end overload control. An eNB under overload control may reject any further WTRUs attempting RRC connection requests for non-emergency services. Once the MME has release overload control, the eNBs may resume normal signaling services.

WTRU based handling of MME overload and/or MME load balancing/re-balancing may be modified to allow for an RN is deployed under a DeNB to reconnect to a different DeNB/MME while still maintaining active connections/contexts for WTRUs connect to the RN. Additionally, the overload/rebalancing procedures may be designed to allow the RN to reselect to a different DeNB and/or MME without the RN being released to Idle. For example, if a type-1 RN is released to Idle, RN-WTRUs (e.g., WTRUs connected to the RN) may lose RN-cell coverage and services, resulting in bad subscriber experiences.

Figure 2:
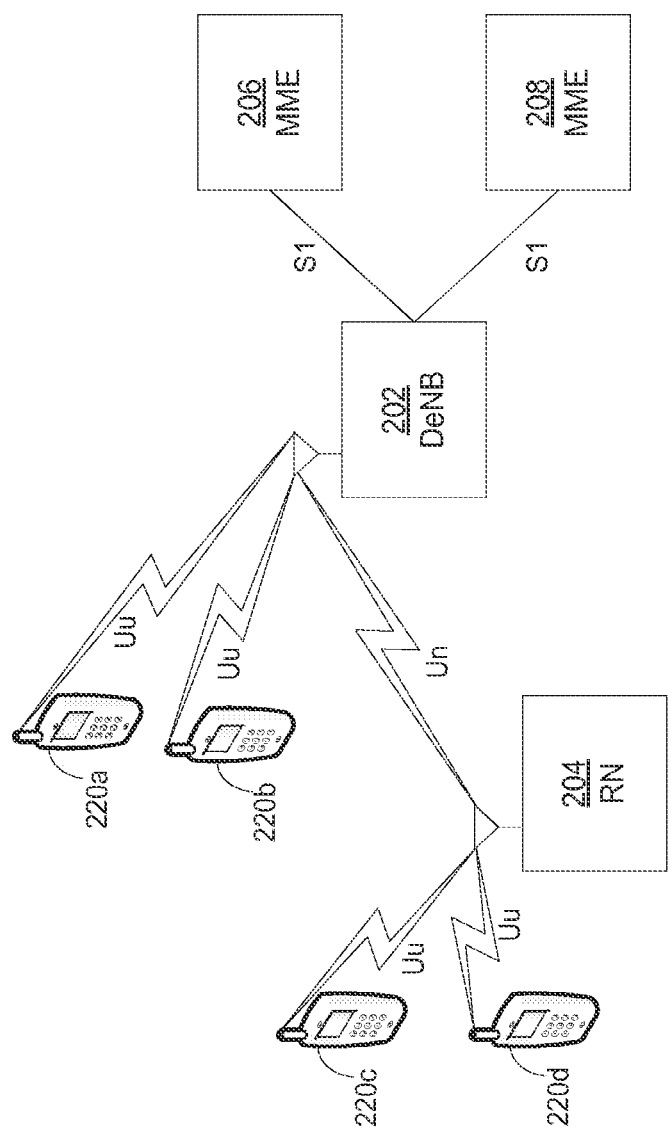
FIG. 2 is a system diagram of an example deployment of a relay node and a donor evolved Node B (eNB)

FIG. 2 illustrates an example system architecture for RN deployment. DeNB 202 may be an eNB configured to support connections for both WTRUs and RNs. For example, WTRU 220a and WTRU 220b may be connected to, served by, and/or camped on DeNB 202. WTRU 220a and WTRU 220b may communicate wirelessly with DeNB 202 via a Uu interface. DeNB 202 may communicate with one or more MMEs (e.g., MME 206 and/or MME 208). DeNB 202 may communicate with MME 206 and/or MME 208 via an S1 interface. DeNB 202 may serve RN 204. DeNB 202 and RN 204 may communicate wirelessly via a Un interface. RN 204 may serve one more WTRUs (e.g., RN-WTRU 220c and/or RN-WTRU 220d). WTRUs served by a RN may be referred to as RN-WTRUs (e.g., RN-WTRU 220c and/or RN-WTRU 220d). RN 204 may communicate with MME 206 and/or MME 208 via its wireless backhaul (e.g., its Un interface) through DeNB 202. DeNB 202 may partition uplink and/or downlink resources between its available Uu and Un interfaces. For example, certain subframes may be partitioned for communication via one or more Uu interfaces (e.g., Uu subframes) and certain subframes may be partitioned for communication via one or more Un interfaces (e.g., Un subframes). The DeNB may utilize time multiplexing to partition the subframes.

According to an embodiment, a DeNB under overload control may receive an 'S1 Overload Start' message from an MME. In an overload scenario, which DeNB/eNB received the 'S1 Overload Start' message may be randomly selected by the MME. For example, DeNB 202 may be currently served by MME 206. DeNB 202 may serve one or more relays that may be attached to it (e.g., RN 204). RN 204 may further serve RN-WTRU 220c and RN-WTRU 220d, and thus may create more signaling load for the MME in overload conditions. MME 206 may send an 'S1 Overload Start' message to DeNB 202. Upon receiving the 'S1 Overload Start' message, DeNB may be configured to take one or more (or any combination) of the following actions. For example, DeNB 204 may reject new attach request originating from WTRUs served by RN 204. In an example, DeNB 204 may reject RRC connection requests originating from RNs attempting to attach to the DeNB. The rejection may occur regardless of whether the attach procedure is for a Phase I or a Phase II start up process.

In an example, DeNB 202, which may act as an S1 proxy to already attached RN 204, may also send an 'S1 Overload Start' message to some or all relays or randomly selected relays connected to the DeNB. The 'S1 Overload Start' message may be sent to a RN even if that particular RN was not selected for overload control by the MME. The relay may then follow overload control procedures until a subsequent 'S1 Overload Stop' message is received.

Further, DeNB 202 may independently initiate overload control procedures with any of RN it serves (e.g., RN 204) if it determines that S1/RRC signaling is utilizing a large fraction of the available Un resources. For example, DeNB 202 may send sending an 'S1 Overload Start' message to any of the RNs that the DeNB is serving based on the determination that S1/RRC signaling is utilizing a large fraction of the available Un resources.

For the MME load (re)balancing cases, a RN may be switched to a different DeNB or may remain with the current DeNB. In the case where the RN does not reselect to a new DeNB, an intra-DeNB action method to the RN and/or an internal (or backend) signaling action may be used to accomplish the MME rebalancing while maintaining the RN in an RRC_Connected state. Such intra-DeNB rebalancing may be utilized rather than utilizing RRC release messaging to command the RN to release from the DeNB and then reconnect to the same DeNB.

There may be different signaling steps in MME rebalancing to avoid releasing the RN. For example, the following actions (which may be performed in any order or combination) may be used to internally switch the RN from the offloading MME to a different MME within an MME-pool. When the network OAM and/or MME determine to offload an RN from the current RN-MME to another MME within the same MME-pool (or an MME within the connection reach of the same DeNB), the current RN-MME may issue a S1 'RN Context Release' to the DeNB. The "RN Context Release" message may include an identification of the RN to be dropped, a cause, and/or an identity of a new MME. For example, RN 204 may be served by DeNB 202, which may in turn be served by MME 206. Upon detecting overload on the S1 interface between MME 206 and DeNB 202, MME 206 may send a 'RN Context Release' message to DeNB 202. The 'RN Context Release' message may or may not identify RN 204. Additionally, the 'RN Context Release' message may or may not identify MME 208 as a possible MME to select. DeNB 202 may select MME 208 based on its allowed MME-pool.

For example, to internally switch RN 204 from the offloading MME (e.g., MME 206) to a different MME within the MME-pool (e.g., MME 208), DeNB 202 may send a request to RN 204 instructing it to maintain its current RRC connection and the current Un/Uu configuration and/or operations. The request may also indicate that RN 204 should send back a tracking area update (TAU) message to DeNB 202. When DeNB 202 receives the TAU message from DeNB 202, DeNB 202 may be triggered to select another MME for load rebalancing. For example, DeNB 202 may perform one or more of the following procedures in any combination. DeNB 202 may send an RRC message with a special indicator (e.g., a RRC-ConnectionRelease message with the cause value "load balancing TAU required") to RN 204. DeNB 202 may still maintain the RRC connection and/or other configurations including the Un interface configurations towards RN 204. RN 204 may determine not to release the RRC connection and Un configuration, and may maintain operations supporting the RN-connected WTRUs. RN 204 may perform some of the RRC Connection Re-establishment like operations, for example resetting its radio bearers with respect to DeNB 202. RN 204 may issue a TAU message towards the DeNB 202 without indicating the registered MME (e.g., MME 206). DeNB 202 may connect RN 204 to the new MME (e.g., MME 208) and resume the S1 context for the RN 204.

In an example, DeNB 202 may send to the RN 204 a RRC RN Configuration message. For example, the RRC RN Configuration message may include a HO command for the same Un resources over the same DeNB (e.g., DeNB 202) and/or a special indicator indicating requesting an intra-DeNB handover-type action for the RN. The RN having received the RN configuration message (e.g., RN 204) may maintain its same RRC connection, its Un interface/subframe configuration, and/or connections for WTRUs attached/connected to it (e.g., RN-WTRUs). In an example, the RN 204 may receive the RN configuration message and may perform an intra-DeNB HO (as per the HO configuration) to the same DeNB (e.g., DeNB 202) while maintaining the RN-WTRUs (e.g., RN-WTRU 220c and/or RN-WTRU 220d). RN 204 may issue a TAU message to DeNB 202 without indicating the registered MME. DeNB 202 may connect RN 204 to the new MME (e.g., MME 208) and may resume the S1 context for RN 204.

In an example, DeNB 202 may connect RN 204 with the new MME (e.g., MME 208) and route the MME/RN traffic to MME 208 via the new route. By doing so, DeNB 202 may internally rebalance the RN load to a new RN-MME. DeNB 202 may trigger RN 204 to switch to the new MME (e.g., MME 208) by performing a MME configuration update procedure. For example, DeNB 202 may send a MME Configuration Update Request message to RN 204 to update the new MME relationship with the RN.

Figure 3:
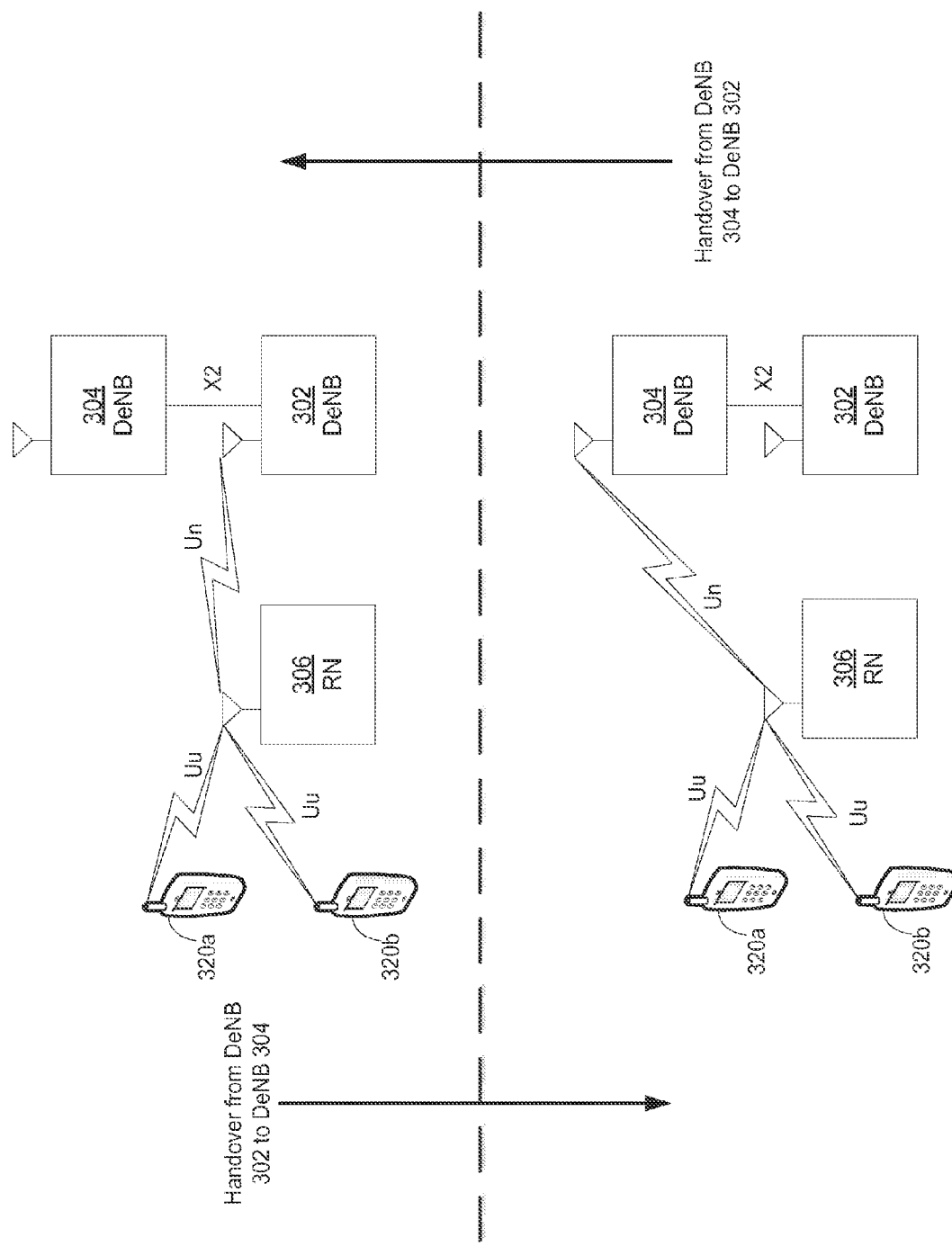
FIG. 3 is a system diagram illustrating and example handover of a relay node.

In addition to switching control of an RN served by a DeNB from first MME to a second MME, a RN may also be handed over to another DeNB via RRC control. An example system diagram illustrating a handover of an RN from first DeNB to a second DeNB is shown in FIG. 3. The handover of an RN from a first DeNB to a second DeNB may be referred to as "re-hosting." Re-hosting an RN may be performed in order to accomplish MME (re)balancing or the E-UTRAN load balancing. For example, the re-hosting of a RN with its serviced WTRUs (e.g., WTRUs that are connected to the RN) may be performed such that the RN with its serviced WTRUs get handed over to a different DeNB without experiencing a RN RRC connection release. The RN may remain in RRC_Connected state. Additionally, the RN may continuously maintain the RN cell and the RN-WTRUs connected to or camped on the RN cell.

With respect to FIG. 3, as shown in system 300, RN 306 may be served by DeNB 302. Additionally, RN-WTRU 320*a* and RN-WTRU 320*b* may be connected to or camped on RN 306. DeNB 304 may be a DeNB on the DeNB-list for RN 306. Upon handover of RN 306 from DeNB 302 to DeNB 304, RN 306 may or may not be handled by the same MME. System 350 illustrates and example system architecture as a result of the handover of RN 306 from DeNB 302 to DeNB 304. At a high level, in various examples, a RN may be handed over directly to another accessible DeNB on the same or a different network over a radio interface. This may help avoid network coverage loss to the users due to the RN being released to Idle. In the example shown in FIG. 3, RN-WTRU 320*a* and/or RN-WTRU 320*b* may remain in a connected state while RN 306 is handed over from DeNB 302 to DeNB 304 or when RN 306 is handed over from DeNB 304 to DeNB 302. When transitioning from system 300 to system 350, DeNB 302 may be referred to as a source DeNB and DeNB 304 may be referred to as a target DeNB. When transitioning from system 350 to system 300, DeNB 304 may be referred to as a source DeNB and DeNB 302 may be referred to as a target DeNB.

In an example, the handover target DeNB in the RN handover procedure may be associated with one or more of the following criteria. For example, the handover target DeNB may be a DeNB in the DeNB-list of the RN. In an example, the target DeNB may be a neighbor DeNB that has been measured by the RN and reported to the current source DeNB. In an example, the target DeNB may be accessible by the RN. In an example, the RN to be handed over, the source DeNB, and or an MME serving the RN may determine that the target DeNB is not overloaded prior to performing the handover.

In an example, the node originating the handover (e.g., a DeNB or an MME) determines to re-host the RN and may initiate actions to obtain RN Handover information. Example RN Handover information that may be gathered or obtained by the originating node may include one or more of the following RN handover parameters, in any combination. In an example, RN handover parameters may include the DeNB-list of the RN. In an example, the RN handover parameters may include operation information of the DeNBs (e.g., the source DeNB and the target DeNB) such as the load conditions, the radio propagation conditions with respect to the RN, etc. In an example, the RN handover parameters may include the RN Un interface configuration (e.g., for a type-1 RN, the Un subframe configuration). In an example, the RN handover parameters may include the RN location information, the RN neighbor cell information, RN timing/synchronization information, and/or the RN load conditions.

In an example, the source DeNB or the target DeNB may initiate the RN re-hosting. For example, the source DeNB may contact to the RN-OAM (e.g., the OAM node associated servicing the RN) requesting the RN's DeNB-list. The DeNB may also request the operating status of one or more DeNBs on the RN's DeNB-list. The RN's DeNB-list and/or status information of DeNBs on the DeNB-list may be used as the target DeNB information. The DeNB may also request one or more RN handover parameters from a potential target DeNB and/or the RN-OAM. In an example, the source DeNB may send a request to the RN asking the RN to report its DeNB-list. In an example, the source DeNB may send a request to the RN asking the RN to identify DeNBs that are accessible by the RN. The RN may perform neighbor cell measurements and answer the request based on the neighbor cell measurement. The neighbor cell measurements may be included in the answer to the request or may be sent to DeNB periodically.

When the source DeNB has obtained the potential target DeNB information, it may send a handover (HO) request to one or more candidate target DeNBs. The HO request may include the current RN Un subframe configuration information and/or the timing/synchronization information. The target DeNB(s) may accept the HO request and may send a response back to the source DeNB HO information, which may include the RN handover parameters or other control information. The response to the HO request may contain a shell RRC message to be forwarded to the RN. The HO information may include a new Un subframe configuration and or a dedicated access RACH signature. The HO information may also include a switching time, a synchronization time, an uplink grant, and/or the like.

When the source DeNB receives the response from the one or more target DeNBs, the source DeNB may determine to which DeNB the RN is to be handed over. The source DeNB may initiate the transfer of the RN-WTRU(s)/RN/DeNB contexts or context related information to the chosen target DeNB. The target DeNB may command the RN to handover to the selected target DeNB via an RRCRNReconfiguration message with the HO configuration for the new target DeNB. The RN may switch to the target DeNB with the Un configuration specified in the RRCRNReconfiguration message when ready or, if provided, at the switching time. For example, the RN may directly access the target DeNB if the RN has previously measured the new target DeNB and the configuration includes one or more of the Un subframe configuration, the synchronization information, or an uplink grant. IN an example, the RN may start accessing the target DeNB with a special RN RACH access procedure defined in further detail herein. The RN may perform a TAU under the target DeNB. For example, if the re-hosting was performed in order to facilitate MME load rebalancing, the TAU may be performed in order to complete MME rebalancing procedure. The RN may also be instructed to perform TAU in the handover command/RRCRNReconfiguration message. Finally, based on the tracking area information of the DeNB/new cell, the DeNB may determine to perform the TAU. Both fixed RNs and mobile RNs may perform handovers from a DeNB to another DeNB.

In an example, to facilitate the handover of the RN and its associated RN-WTRUs, the target DeNB may, based on its call admission policy, perform one or more of the following actions. The target DeNB may accept HO of the RN and its associated RN-WTRUs. The target DeNB may accept HO of the RN and only certain RN-WTRUS, for example RN-WTRUs with pre-defined QoS subscriptions. The target DeNB may accept HO of the RN but may reject the RN-WTRUs. The target DeNB may reject the RN and the NR-WTRUs. If the target DeNB does not accept the RN and/or some or all of its associated RN-WTRUs, the source DeNB and RN may ensure that the rejected RN and/or RN-WTRU(s) are able to revert back to the original cell without loss of service. In case wherein the RN is accepted but one or more (or all) RN-WTRUs are rejected, the RN, which is to be associated with the new target DeNB, may handover the UEs to the original source DeNB.

In an example, a MME may initiate the RN re-hosting and handover from a first DeNB to a second DeNB. For example, in the case wherein the RN re-hosting is originated from a MME in order to perform MME rebalancing, both actions related to MME re-balancing and actions related to RN handover from a first DeNB to a second DeNB may be performed, as is described herein. In MME initiated handover scenarios, an RN-MME (e.g., the MME currently hosting an RN) may initiate the DeNB-list acquisition from the RN-OAM. The RN-MME may also request the operating status of potential target DeNB(s) in order to gather the target DeNB information. In an example, the RN-MME send a request to the source DeNB instructs the source DeNB to obtain the DeNB-list or to obtain the RN's neighboring cell information via the RN measurements. In an example, when the RN-MME has gathered the target DeNB information, the RN-MME may request the DeNB to perform the RN re-hosting on behalf of the MME.

In an example, if a RN handover is not able to be performed because the RN is unable to access other DeNB(s) in addition to the current DeNB (e.g., there are no other DeNBs in the area/within range of the RN or there are no DeNBs within range of the RN that are accepting connections), the originating node (a DeNB or an MME) may perform one or more of the following actions in any order or combination. The originating node may revoke the offload decision (e.g., a MME may cancel rebalancing procedures). The originating node may send a reject message back with a "no offloading dock" code (e.g., if a DeNB executing on behalf of a MME cannot find a suitable target DeNB, the reject message may be sent to the RN-MME from the source DeNB). The originating node may select another RN to offload/drop. The originating node may perform offloading of WTRUs from the DeNB or from the RN (e.g., RN-WTRUs). The originating node may release the RN.

In an example, rather than the DeNB performing HO of RN for load balancing, the MME or the DeNB may command a RN to perform load balancing for WTRUs under RN control (e.g., RN-WTRUs). The command may be sent via S1, X2 and/or RRC signaling There may be a special RACH procedure for the RN and/or for RN handover. The RN special RACH access procedure may enable the RN to maintain its RN-cell and maintain connections for RN-WTRUs. The RN-WTRUs may remain in an RRC_Connected state while the RN performs a RACH access procedure with a dedicated signature/preamble towards a new DeNB. The RACH access procedure may be used to obtain the cell synchronization and/or an initial uplink grant. The dedicated signature may be allocated by the target DeNB. When determining the appropriate RACH signature/preamble for the RN, the target DeNB may select the preamble based on the current or future RN Un subframe configuration, especially the RN uplink transmission occasions. In an example, the current Un subframe configuration (e.g., the Un subframe configuration at the source DeNB) may be the same as the future Un subframe configuration (e.g., the Un subframe configuration at the target DeNB after handover). The RN, at the Un uplink subframe(s) transmission occasion(s), may transmit the dedicated signature to the new target DeNB. The RN may monitor its Un downlink subframe's R-PDCCH for the random access response (the RAR) from the new target DeNB. Once the RN has received the RAR with an uplink grant, the special RACH procedure for RN ends, the RN may start the Un interface operations with the new target DeNB.

The current definitions of the Layer 2 (L2) measurements performed by the E-UTRAN over the Uu interface may support the E-UTRA radio link operations, radio resource management (RRM), network operations and maintenance (OAM), and self-organizing networks (SON) functions or functionalities. L2 measurements at an eNB were designed to provide the performance indicators, such as the PRB (physical resource block) usage, the number of active WTRUs, the packet delay, the data loss, etc. The L2 measurements may be obtained and used as the performance indicators to reflect the traffic conditions, resource utilizations, and/or the operating efficiencies over the Uu radio interface between the WTRUs and the E-UTRAN.

For example, the PRB usage measurement may be used to measure the percentage of the used PRBs per UL/DL by WTRUs with respect to the total available PRBs of the cell over a certain time interval. A PRB usage measurement may provide an estimation of the traffic load of the cell and may be used as an indicator of the cell congestion level. PRB usage may be used as criteria in call admission control, load balancing, and/or inter-cell interference control. PRB usage may also be used for OAM performance observability. The L2 measurement results taken by eNBs may be shared with neighbor eNBs over the X2 interface and load balancing handovers to neighbor cells may be initiated based on the measurements. Herein improvements are presented for RN handling in the network load balancing and overload control and L2 measurements on eNB.

In order to better indicate cell usage and to provide more detailed information regarding the type of usage within a RAN, new measurements to be performed by RAN nodes are defined herein. For example, an eNB may be configured to perform measurements on its Uu interface and its Un interface separately. The two sets of measurements (e.g., L2 measurements on a DeNB's Uu interface and L2 measurements on the DeNB's Un interface) may better or more accurately reflect the traffic conditions. To provide for more accurate information regarding how the DeNB Uu air interface is shared by both type-1 RNs and macro-WTRUs, new L2 measurements in the eNB or the RN are defined herein. The L2 measurements performed on the Uu and Un interfaces of the DeNB may be utilized to support the E-UTRA radio link operations (e.g., support Uu interface and/or Un interface operation), radio resource management (RRM) (e.g., repartitioning of Uu and/or Un radio resources), network operations and maintenance (OAM) (e.g., for OAM performance observability), and self-organizing networks (SON) functions or functionalities (e.g., RN/WTRU handover and/or RN connection maintenance).

A DeNB may measure the PRB usage on its Uu and Un interface separately for estimating the congestion level on each interface accurately. This information can be used by the DeNB for load balancing either among different cells or for repartitioning resources between its Un and Uu interface. Among other things, disclosed herein are new L2 measurements at DeNB which have independent measurement on PRB usage on Un subframe usage. The new measurements may apply to DeNB supporting type1, type-1a, and type 1-b relays.

Measurements on RN's total PRB usage over Un subframes may be performed. The measurement may monitor the resource usage on a DeNB's Un interface in order to detect the load condition on the DeNB-RN interface for Un subframes. The measured results may be used for load balancing, call admission control, and/or congestion control at the DeNB.

The percentage of DeNB-RN PRBs used over time period T may be defined as M_RN(T), where the value of M_RN(T) may be expressed as percentage of possible Un subframe PRB usage. A value of M_RN(T) may be obtained by dividing the total number of PRBs allocated for usage by RN(s) during a given time period T (M1_RN(T)), by the total available PRB resources in Un subframes assigned to RN(s) during a given time period T (P_RN(T)).

For example, total DeNB-RN PRB usage may be calculated at the Service Access Point between MAC and L1. The measurement may be performed separately for DL and UL. Equation (1) may represent total RN PRB usage in the Un subframes, which may be a percentage of PRBs used by RN(s) on the Un interface, averaged during time period T. The value of the total RN PRB usage in the Un subframes may range from 0-100%.

$$M\_RN(T) = \left\lfloor \frac{M1\_RN(T)}{P\_RN(T)} * 100 \right\rfloor \quad \text{Equation (1)}$$

M1_RN(T) may represent a count of full physical resource blocks allocated for RN transmission/reception during time T. For the DL, PRBs used for transmission may be included. For the UL, PRBs allocated for transmission may be included. P_RN(T) may represent the maximum number of PRBs that are available (e.g., the total number of PRBs available) during time period T for Un subframes. T represents the time period during which the measurement is performed.

In another example, the RN PRB Usage in the Un subframes actually assigned to RNs may be defined as the number of the RN PRBs (M1_RN(T)) divided by the difference between the total number of PRBs in the Un subframes (P_RN(T)) and the number of macro-WTRU PRBs (e.g., PRBs assigned to WTRUs connected directly to the DeB) within the same Un subframes during time period T (M1_DoUE(T)). Equation (2) may represent the RN PRB Usage in the Un subframes actually assigned to RNs.

$$M\_RN(T) = \left\lfloor \frac{M1\_RN(T)}{P\_RN(T) - M1\_DoUE(T)} * 100 \right\rfloor \quad \text{Equation (2)}$$

Total DeNB-RN PRB usage may be calculated at the Service Access Point between MAC and L1. The measurement may be performed separately for DL and UL.

In another example, the RN PRB Usage in the Un subframes actually assigned to RNs may be measured as the number of the RN PRBs during time period T (M1_RN(T)) divided by the difference between the total number of PRBs in the Un subframes (P_RN(T)) and the number of macro-WTRU PRBs for non-preemptable macro-WTRU traffic within the same Un subframes in the time period of T (M2_DoUE(T)). Equation (3) may represent the RN PRB Usage in the Un subframes actually assigned to RNs.

$$M\_RN(T) = \left\lfloor \frac{M1\_RN(T)}{P\_RN(T) - M2\_DoUE(T)} * 100 \right\rfloor \quad \text{Equation (3)}$$

Total DeNB-RN PRB usage may be calculated at the Service Access Point between MAC and L1. The measurement may be performed separately for DL and UL. The non-preemptable macro-UE traffic in the Un subframes during time period T (M2_DoUE(T)) may be the WTRU data traffic that may be time critical (e.g., its transmission could not wait for a non-Un subframes). Examples of WTRU data traffic that may be considered time critical are data traffic that is semi-persistently scheduled, data traffic that is TTI-bundled, data traffic that is critical to a WTRU DRX on-duration time limit, and/or HARQ timing related traffic.

Another measurement that may be defined in order to evaluate resource usage may be macro-WTRU resource usage on Un subframes. Macro-WTRUs may be WTRUs that are connected to a DeNB that is partitioning resources to one or more RNs. Macro-WTRUs may also be referred to as donor WTRUs or donor UEs. Macro WTRUs may communicate with the DeNB via a Uu interface. However, Macro-WTRUs may be assigned resources during subframes allocated to a RN for the Un interface of the RN, for example, if the RN has not been allocated resources for available Un subframes. Measurements of macro-WTRU PRB usage on Un subframes may be done separately for DL and UL. The measured results may be expressed as M_DoUE(T). The results of macro-WTRU PRB usage measurements may be used together with the measured RN PRB usage M_RN(T) (see above) to determine the load condition over the currently assigned, actual Un subframes.

M_DoUE(T) may be determined by dividing the measured number of PRBs allocated for the macro-WTRU usage over time period T (M1_DoUE(T)) by the total available PRB resources that could be used by RNs during a time period T (P_RN(T)). The P_RN(T) may be defined as the total number of PRBs available in the Un subframes actually assigned to RNs during the measurement time period T. Equation (4) may represent the macro-WTRU PRB usage in the Un subframes actually assigned to RNs.

$$M\_DoUE(T) = \left\lfloor \frac{M1\_DoUE(T)}{P\_RN(T)} * 100 \right\rfloor \quad \text{Equation (4)}$$

The macro-WTRU PRB usage over actual RN subframes may be calculated at the Service Access Point between MAC and L1. The measurement may be performed for downlink Un subframes. M_DoUE(T) may be defined as the macro-WTRU PRB usage over the actual Un subframes. M_DoUE(T) may be a percentage of PRBs used, averaged during time period T on Un interface subframes assigned to RNs. The value may range from 0-100%. M1_DoUE(T) may be a count of full physical resource blocks allocated for macro-WTRU transmission/reception over the Un subframes for macro-WTRUs during time T.

The actual load condition for the Un subframes during period T may be expressed as L_UnA(T). For example, the actual load condition for the Un subframes during period T may be obtained at the DeNB by adding the actual macro-WTRU PRB usage to the actual RN PRB usage. These measurements may be obtained as described above, an may relate to PRB usage over Un subframes actually assigned to the RNs during time period T. Equation (5) may represent actual load condition for the Un subframes during period T.

$$L\_UnA(T) = M\_RN(T) + M\_DoUE(T) \qquad \text{Equation (5)}$$

L_UnA(T) may be a percentage with a value from 0-100%. The measurement of the actual load condition over Un subframes may be performed separately for DL and UL. In an example, the actual load condition L_UnA(T) for the Un interface during period T may be obtained at the DeNB by dividing the sum of the total number of RN PRBs during the measurement period T and the total number of macro-WTRU PRBs during the measurement period T by the total number of PRBs available in the Un subframes actually assigned to the RNs during the measurement period T. Equation (6) may represent actual load condition for the Un subframes during period T.

$$L\_UnA(T) = \left\lfloor \frac{M1\_RN(T) + M1\_DoUE(T)}{P\_RN(T)} * 100 \right\rfloor \qquad \text{Equation (6)}$$

For example, RN PRB usage during Un subframes, macro-WTRU usage during Un subframes, and/or the actual load condition for Un subframes may be used by the DeNB and/or other nodes such as an MME/OAM for the Uu/Un interface repartitioning action. For example, a DeNB may add or remove Un subframes (e.g., as a subframe-configuration-unit) to or from the current, actually assigned Un subframes when one or more of the following conditions occur. The DeNB may add and/or remove Un subframes (e.g., trigger a Un subframe reallocation) when L_UnA(T) approaches or is above/over a high percentage value threshold and/or when L_UnA(T) approaches or is below a low percentage threshold. For example, the DeNB may add Un subframes (e.g., allocate more subframes for the Un interface) when L_UnA(T) approaches or is above/over a high percentage value threshold. The DeNB may remove Un subframes (e.g., allocate fewer subframes for the Un interface) when L_UnA(T) approaches or is below a low percentage threshold. The DeNB may add and/or remove Un subframes (e.g., trigger a Un subframe reallocation) when the RN PRB Usage M_RN(T) is above and/or below one or more thresholds. In an example, the DeNB may add Un subframes when the RN PRB Usage M_RN(T) is above a threshold. The DeNB may remove Un subframes when the RN PRB Usage M_RN(T) is below a threshold. In an example, the DeNB may add and/or remove Un subframes (e.g., trigger a Un subframe reallocation) when a ratio of the RN PRB usage M_RN(T) to the macro-WTRU PRB usage M_DoUE(T) is above a threshold and/or below a threshold. In an example, the DeNB may add and/or remove Un subframes (e.g., trigger a Un subframe reallocation) when the value of macro-WTRU PRB usage M_DoUE(T) is above a threshold and/or below a threshold.

Additionally, measurements for PRB usage for Un subframes may be performed per traffic class. For example, a measurement of total RN PRB usage over Un subframes average over a time period T may be performed per traffic class. Such a measurement may monitor the resource usage on a DeNB's Un interface per traffic class. Traffic class may be defined based on the quality of service class (QoS) indicator (QCI or herein qci) associated with a transmission. The total RN PRB usage over Un subframes per traffic class may be expressed as M_RN(qci), which may be the percentage of RN PRB usage pertaining to a RN traffic class (e.g., QCI).

A PRB usage per RN traffic class measurement may be defined as an aggregate measurement for RNs in a cell, and may be applicable to Dedicated Traffic Channels (DTCHs). The measurement may be performed at the Service Access Point between MAC and L1. The measurement may be performed separately for DL DTCHs for each QCI and UL DTCHs for each QCI.

M_RN1(T, qci) may be defined as the absolute RN PRB usage over the Un subframes per RN traffic class during a time period T and may be a count of full or partial physical resource blocks. Equation (7) may represent the absolute RN PRB usage over the Un subframes per RN traffic class during a time period T.

$$M\_RN1(T, qci) = \sum_{\forall t} \sum_{\forall p \in S(t)} \frac{1}{W(p)} * X(t) * \frac{B(t, qci)}{B(t)} \qquad \text{Equation (7)}$$

M_RN(qci) may be defined as the RN PRB usage over Un subframes per traffic class, which may be a percentage of PRBs used for a certain RN traffic class (e.g., the QCI) over the available PRBs for the RN, averaged during time period T. The value may range from 0-100%. Equation (8) may represent the RN PRB usage over Un subframes per RN traffic class during a time period T.

$$M\_RN(qci) = \left\lfloor \frac{M\_RN1(T, qci)}{P\_RN(T)} * 100 \right\rfloor \qquad \text{Equation (8)}$$

The variable t may be defined as a variable representing transport block(s) in time period T that contain DTCH data during Un subframes. Initial transmissions and HARQ retransmissions may be counted towards t. B(t, qci) may be defined as the total number of DTCH bits for RN DTCHs with a QCI value of qci, carried in transport block t transmitted on the Un interface. B(t) may be defined as the total number of DTCH bits for RN DTCHs with a QCI value of qci, carried in transport block t transmitted on Un interface.

M_RN(qci) may be defined as RN PRB usage per traffic class over Un subframes. A value of M_RN(qci) may be a percentage of PRBs used for a certain qci, averaged during time period T, which may range from 0-100%. M_RN1(T, qci) may be defined as absolute PRB usage per RN traffic class over Un subframes, which may be a count of full or partial physical resource blocks. T may be the timer period during which the measurement is performed (e.g., may be evaluated in terms of TTIs). t may be defined as transport blocks in timer period T that contain DTCH data over the DeNB-RN interface (e.g., Un interface). Initial transmission and HARQ retransmissions may be counted when determining values of t. S(t) may be the set of physical resource blocks used for transmission of transport block t. W(p) may be the number of transport blocks that are currently sharing PRB p. B(t, qci) may be the total number of DTCH bits for RN DTCHs with a QCI value of qci, carried in transport block t and transmitted on the Un interface. B(t) may be the total number of DTCH and Downlink Control Channel (DCCH) bits carried in transport block t and transmitted on the Un interface. X(t) may be defined to take multiplexing into account. For example, X(t) may be defined as X(t)=1 if multiplexing is taken into account. If multiplexing is not taken into account, X(t) may be defined as X(t)=1 if transport block t carries data corresponding to a single QCI. If multiplexing is not taken into account, X(t) may be defined as X(t)=0 if transport block t carries data corresponding to two or more QCI values.

In another example, RN PRB per traffic class usage measurements may be obtained in other ways. The RN PRB Usage per traffic class in the Un subframes actually assigned to RNs may be defined as the number of the RN PRBs for a specific traffic class/QCI (M_RN1(T, qci)) divided by the difference between the total number of PRBs in the Un subframes (P_RN(T)) and the number of macro-WTRU PRBs (M1_DoUE(T)) within the same Un subframes (see above with regards to macro-WTRU PRB Usage) over the time period T. Equation (9) may represent the absolute RN PRB usage over the Un subframes per RN traffic class during a time period T. Equation (10) may represent the RN PRB Usage per traffic class in the Un subframes actually assigned to RNs during a time period T.

$$M\_RN1(T, qci) = \sum_{\forall t} \sum_{\forall p \in S(t)} \frac{1}{W(p)} * X(t) * \frac{B(t, qci)}{B(t)} \quad \text{Equation (9)}$$

$$M\_RN(qci) = \left\lfloor \frac{M\_RN1(T, qci)}{P\_RN(T) - M1\_DoUE(T)} * 100 \right\rfloor \quad \text{Equation (10)}$$

Total DeNB-RN PRB usage may be calculated at the Service Access Point between MAC and L1. The measurement may be performed separately for DL and UL.

In an example, the RN PRB per traffic class usage in the Un subframes actually assigned to RNs may be evaluated as the absolute number of the RN PRBs for a specific traffic class/QCI (M_RN1(T, qci)) divided by the difference between the total number of PRBs in the Un subframes P_RN(T) and the number of macro-WTRU PRBs for non-preemptable macro-WTRU traffic (M2_DoUE(T)) within the same Un subframes during time period T. Equation (11) may represent the RN PRB Usage per traffic class in the Un subframes actually assigned to RNs during a time period T.

$$M\_RN(qci) = \left\lfloor \frac{M\_RN1(T, qci)}{P\_RN(T) - M2\_DoUE(T)} * 100 \right\rfloor \quad \text{Equation (11)}$$

Total DeNB-RN PRB usage may be calculated at the Service Access Point between MAC and L1. The measurement may be done separately for DL and UL.

Similarly, measurements with regard to macro-WTRU PRB usage on Un subframes may be defined and performed on a per QCI basis. This measurement may monitor the macro-WTRU resource usage on Un subframes per traffic class/QCI. The measurement may be performed separately for DL DTCHs for each QCI, and/or UL DTCHs for each QCI. The measured results may be defined as M_DoUE(T, qci), and may be used with the measured RN PRB usage (e.g., M_RN(T, qci)) to determine the load condition over the currently assigned actual Un subframes per traffic class/QCI. For example, M_DoUE(T, qci) may be obtained by dividing the measured number of PRBs allocated for macro-UE usage over period T with a QCI value of qci (M1_DoUE(T, qci)) by the total available PRB resources that could be allocated in Un subframes during a given time period T (P_RN(T)). Equation (12) may represent the macro-WTRU PRB Usage per traffic class in the Un subframes during a time period T.

$$M\_DoUE(T, qci) = \left\lfloor \frac{M1\_DoUE(T, qci)}{P\_RN(T)} * 100 \right\rfloor \quad \text{Equation (12)}$$

M_DoUE(T, qci) may be defined as the macro-WTRU PRB usage over actual Un subframes per traffic class (qci), which may be a percentage of PRBs used, averaged during time period T on Un interface subframes assigned to RNs. M_DoUE(T, qci) may take a value in the range from 0-100%. M1_DoUE(T, qci) may be defined as a count of full physical resource blocks allocated for macro-WTRU transmission or reception over the Un subframes with QCI=qci during time T.

In an example, a measurement for the actual load condition for Un subframes per traffic class during period T (L_UnA(T, qci)) may be performed. The actual load condition for the Un subframes per traffic class during period T may be obtained at the DeNB by adding the actual per QCI macro-WTRU PRB usage to the actual per QCI RN PRB usage. Both the actual per QCI macro-WTRU PRB usage and the actual per QCI RN PRB usage may be obtained over Un subframes actually assigned to the RNs during period T. The measurement may be performed separately for DL DTCHs for each QCI and/or UL DTCHs for each QCI. Equation (13) may represent the actual load condition for Un subframes per traffic class during period T. L_UnA(T, qci) may range in value from 0 to 100%.

$$L\_UnA(T,qci)=M\_RN(T,qci)+M\_DoUE(T,qci) \quad \text{Equation (13)}$$

In an example, the actual load condition L_UnA(T, qci) for the Un interface during period T may be obtained at the DeNB by dividing the sum of the total number of per QCI RN PRBs and the total number of per QCI macro-WTRU PRBs by the total number of PRBs available in the Un subframes actually assigned to the RNs in the measurement period T. Equation (14) may represent the actual load condition for Un subframes per traffic class during period T. L_UnA(T, qci) may range in value from 0 to 100%.

$$L\_UnA(T, qci) = \left\lfloor \frac{M1\_RN(T, qci) + M1\_DoUE(T, qci)}{P\_RN(T)} * 100 \right\rfloor \quad \text{Equation (14)}$$

A measurement may be performed in order to determine the total PRB usage over Un subframes on a per RN basis. For example, the measurement may yield the percentage of PRB usage by RN station J over time period T on DeNB's Un interface (M_RN(T, J)). The measurement may be used to evaluate the performance for each individual RNs including RN station J. The DeNB may determine the percentage of PRB usage by RN station J during time T (M1_RN(T, J)) by dividing the number of PRBs used by RN station J over time T (M1_RN(T, J)) by the total available PRB resources in Un subframes assigned to RN(s) during a given time period T (P_RN(T)). Equation (15) may represent the total PRB usage over Un subframes by RN station J.

$$M\_RN(T, J) = \left\lfloor \frac{M\_RN(T, J)}{P\_RN(T)} * 100 \right\rfloor \quad \text{Equation (15)}$$

RN PRB usage may be calculated at the Service Access Point between MAC and L1. The measurement may be done separately for DL and UL. M_RN(T, J) may be the percentage of PRBs used by RN station J on the Un interface averaged during time period T. The value of M_RN(T, J) may range from 0-100%. M1_RN(T, J) may be an absolute count of full physical resource blocks allocated for RN station J transmission or reception during time period T. For the DL, M1_N(T, J) may include PRBs used for transmission by RN station J. For the UL, M_RN(T, J) may include PRBs allocated to RN station J for transmission. J may indicate that the measurement was performed with respect to RN station J. P1_RN(T) may represent the maximum number of PRBs in Un subframes that are available for use by RN station J during time period T.

In an example, rather than (or in addition to) determining the ratio the number of PRBs used by RN station J over time T (M1_RN(T, J)) to the total available PRB resources in Un subframes assigned to RN(s) during a given time period T (P_RN(T)), the maximum number of PRBs in Un subframes that are available for use by RN station J during time period T (P1_RN(T)) may be used as the basis of the usage measurement. For example, P1_RN(T) may represent the total number of PRBs in Un subframes assigned to the RN station J. Equation (16) may represent the total PRB usage over Un subframes by RN station J.

$$M\_RN(T, J) = \left\lfloor \frac{M1\_RN(T, J)}{P1\_RN(T)} * 100 \right\rfloor \quad \text{Equation (16)}$$

In an example, rather than (or in addition to) determining the ratio the number of PRBs used by RN station J over time T (M1_RN(T, J)) to either the total available PRB resources in Un subframes assigned to RN(s) during a given time period T (P_RN(T)) or the maximum number of PRBs in Un subframes that are available for use by RN station J during time period T (P1_RN(T)), the measurement may utilize the available number of PRBs in Un subframes that are actually assigned to RN station J (P2_RN(T)). Equation (17) may represent the total PRB usage over Un subframes by RN station J.

$$M\_RN(T, J) = \left\lfloor \frac{M1\_RN(T, J)}{P2\_RN(T)} * 100 \right\rfloor \quad \text{Equation (17)}$$

In cases where more two or more RNs share assigned Un subframes, the number of PRBs available to a particular RN, the available PRBs for a particular RN station may be defined as a roughly averaged fractional part of the non-macro-WTRU PRBs in the Un subframes (e.g., 1/N, where N is the number of RNs sharing the resource). In an example, the available PRBs for a particular RN station may be defined as a fractional part of the resource to RNs based on their current load. In an example, the available PRBs for a particular RN station may be defined based on a DeNB scheduler implementation known internally to the DeNB (e.g., base the percentage assigned to a given RN station on known past, present, and/or future scheduling information).

In an example, to determine PRB Usage per RN in the Un subframes actually assigned to RNs, a DeNB may determine the number of PRBs used by RN station J on the Un interface averaged during time period T (M1_RN(T, J)) and divide it by the difference between the total number of PRBs in the Un subframes (P_RN(T)) and the number of macro-WTRU PRBs within the same Un subframes during period T (M1_DoUE (T)). Equation (18) may represent the total PRB usage over Un subframes by RN station J.

$$M\_RN(T, J) = \left\lfloor \frac{M1\_RN(T, J)}{P1\_RN(T) - M1\_DoUE(T)} * 100 \right\rfloor \quad \text{Equation (18)}$$

Total Un subframe PRB usage by RN station J may be calculated at the Service Access Point between MAC and L1. The measurement may be performed separately for downlink and uplink communications.

In an example, the RN PRB Usage in the Un subframes actually assigned to RNs may be described as a he number of PRBs used by RN station J on the Un interface averaged during time period T (M1_RN(T, J)) divided by the difference between the total number of PRBs in the Un subframes (P_RN(T)) and the number of macro-WTRU PRBs for non-preemptable macro-WTRU traffic within the same Un subframes in the time period of T (M2_DoUE(T)). Equation (19) may represent the total PRB usage over Un subframes by RN station J.

$$M\_RN(T, J) = \left\lfloor \frac{M1\_RN(T, J)}{P1\_RN(T) - M2\_DoUE(T)} * 100 \right\rfloor \quad \text{Equation (19)}$$

Total Un subframe PRB usage by RN station J may be calculated at the Service Access Point between MAC and L1. The measurement may be performed separately for downlink and uplink communications.

A measurement for PRB usage for Un subframes per RN per traffic class (QCI) over time period T may be performed. The measurement may correspond to PRB usage for Un subframes per RN per traffic class (QCI) over time period T and may be expressed as a percentage of PRB. This measurement may be used to evaluate the performance for each individual RN. The usage per RN station per QCI class on over Un subframes over the time period T (M_RN(T, J, qci)) may be determined by dividing the number of PRBs used by RN station J per qci over time T (M1_RN(T, J, qci)) by the total maximum number of PRBs that could be available for RN station J on Un subframes during time T (P1_RN(T)). The measurement may be performed separately for DL and UL. Equation (20) may represent the total PRB usage for Un subframes per RN per traffic class (QCI) over time period T.

$$M\_RN(T, J, qci) = \left\lfloor \frac{M1\_RN(T, J, qci)}{P1\_RN(T)} * 100 \right\rfloor \quad \text{Equation (20)}$$

RN PRB usage may be calculated at the Service Access Point between MAC and L1. The measurement may be performed separately for DL and UL. M_RN(T, J, qci) may be a percentage of PRBs per traffic class used by RN station J, averaged during time period T, on the Un interface. The value of M_RN (T, J, qci) may range from 0-100%. M1_RN(T, J, qci) may be a count of full resource blocks allocated to RN station J for transmission/reception during time period T per traffic class qci. For the DL, PRBs used for transmission may be included. For the UL, PRBs allocated for transmission may be included.

In an example, the PRB usage per RN per QCI in the Un subframes actually assigned to RNs (M_RN(T, J, qci)) may be determined as the number of full resource blocks allocated to RN station J for transmission/reception during time period T per traffic class qci (M1_RN(T, J, qci)) divided by the difference between the total number of PRBs in Un subframes assigned to RN station J (P1_RN(T)) and the number of macro-WTRU PRBs within the same Un subframes in the time period T (M1_DoUE(T)). Equation (21) may represent the PRB usage per RN per QCI in the Un subframes actually assigned to RNs over time period T.

$$M\_RN(T, J, qci) = \left\lfloor \frac{M1\_RN(T, J, qci)}{P1\_RN(T) - M1\_DoUE(T)} * 100 \right\rfloor \quad \text{Equation (21)}$$

Total DeNB-RN PRB usage may be calculated at the Service Access Point between MAC and L1. The measurement may be performed separately for DL and UL.

In an example, may be determined as the number of full resource blocks allocated to RN station J for transmission/reception during time period T per traffic class qci (M1_RN (T, J, qci)) divided by the difference between the total number of PRBs in Un subframes assigned to RN station J (P1_RN (T)), and the number of macro-WTRU PRBs for non-preemptable macro-WTRU traffic within the same Un subframes in the time period of T (M2_DoUE(T)). Equation (22) may represent the PRB usage per RN per QCI in the Un subframes actually assigned to RNs over time period T.

$$M\_RN(T, J, qci) = \left\lfloor \frac{M1\_RN(T, J, qci)}{P1\_RN(T) - M2\_DoUE(T)} * 100 \right\rfloor \quad \text{Equation (22)}$$

Measurements may be performed for PRB usage per Un subframe configuration (UnSC) unit. The measurement may be performed separately for DL and UL. A basic UnSC unit may be defined as the basic signaling unit for a DeNB to configure an RN for Un subframe assignment. For example, there may be a total of 8 disjointed UnSC units in a donor cell. The UnSC units may be partitions of available subframes on the Un interface, and one or more UnSCs may be assigned to a RN or RNs via RRC signaling. More than one RN may share the same UnSC for RN traffic. Traffic for macro-WTRUs in the donor cell may also be assigned to use the Un subframe resources. For example, the Un subframes may be load-shared by the RN traffic as well as the macro-WTRU traffic. L2 measurements may be performed at the DeNB in order to evaluate PRB usage on a per UnSC basis.

In an example, a measurement for the macro-WTRU PRB usage in Un subframe per UnSC may be performed. The macro-WTRU PRB usage over the given UnSC K (e.g., K maybe the index for the UnSC) during timer period T may be represented as M_DoUEsc(K, T). To evaluate M_DoUEsc(K, T), a DeNB may divide the measured number of PRBs for macro-WTRU with UnSC K during time period T (M1_DoUEsc(K, T)) by the total number of PRBs available over the UnSC K during time T (P_RNsc(K, T)). Equation (23) may represent the macro-WTRU PRB usage in the Un subframes per UnSC over time period T.

$$M\_DoUEsc(K, T) = \left\lfloor \frac{M1\_DoUEsc(K, T)}{P\_RNsc(K, T)} * 100 \right\rfloor \quad \text{Equation (23)}$$

The measured result may be used for deriving the total load condition on an UnSC. The measured result may also be used to predict the loading conditions due to macro-WTRU traffic on other, unassigned UnSCs before a Un Subframe partition expansion.

A measurement for RN PRB usage in Un subframe per UnSC may be performed. In addition to monitoring the total RN traffic usage to the Un subframes (e.g., to assigned UnSC units), RN PRB usage per individual UnSC may also be measured in order to evaluate the load condition for one or more UnSCs. A measurement of RN PRB usage per UnSC may be performed separately for DL and UL. For example, the RN PRB usage per UnSC K during time period T may be expressed as M_RNsc(K, T). A DeNB may obtain M_RNsc (K, T) by dividing the total number of PRBs allocated to RNs in UnSC K during time period T (M1_RNsc(K, T)) by the total number of available PRBs in UnSC K during time period T (P_RNsc(K, T)). Equation (24) may represent the RN PRB usage in the Un subframes per UnSC over time period T.

$$M\_RNsc(K, T) = \left\lfloor \frac{M1\_RNsc(K, T)}{P\_RNsc(K, T)} * 100 \right\rfloor \quad \text{Equation (24)}$$

The measured result may be used for determining the total load condition per UnSC. The measured result may also be used to predict the loading conditions due to the RN traffic on other assigned UnSCs before a Un Subframe partition contraction.

In an example, rather than (or in addition to) determining the ratio of the total number of PRBs allocated to RNs in UnSC K during time period T (M1_RNsc(K, T)) to the total number of available PRBs in UnSC K during time period T (P_RNsc(K, T)), the difference between the total number of PRBs in UnSC K during time period T (P_RNsc(K, T)) and the measured number of PRBs for macro-WTRU with UnSC K during time period T (M1_DoUEsc(K, T)) may be utilized. For example, to determine the RN PRB usage in the Un subframes per UnSC over time period T, the total number of PRBs allocated to RNs in UnSC K during time period T (M1_RNsc(K, T)) may be divided by the difference between the total number of PRBs in UnSC K during time period T (P_RNsc(K, T)) and the measured number of PRBs for macro-WTRU with UnSC K during time period T (M1_DoUEsc(K, T)). Equation (25) may represent the RN PRB usage in the Un subframes per UnSC over time period T.

$$M\_RNsc(K, T) = \left\lfloor \frac{M1\_RNsc(K, T)}{P\_RNsc(K, T) - M1\_DoUEsc(K, T)} * 100 \right\rfloor \quad \text{Equation (25)}$$

In an example, rather than (or in addition to) utilizing the definitions of RN PRB Usage per UnSC disclosed above, RN PRB Usage per UnSC may be determined by dividing the total number of RN PRBs in UnSC K during time period T (M1_RNsc(K, T)) by the difference between the total number of PRBs in the UnSC K during time period T (P_RNsc(K, T)) and the number of macro-WTRUs PRBs assigned to non-preemptable macro-WTRU traffic observed in UnSC K during time period T (M2_DoUEsc(K, T)). Equation (26) may represent the RN PRB usage in the Un subframes per UnSC over time period T.

$$M\_RNsc(K, T) = \left\lfloor \frac{M1\_RNsc(K, T)}{P\_RNsc(K, T) - M2\_DoUEsc(K, T)} * 100 \right\rfloor \quad \text{Equation (26)}$$

where the M2_DoUEsc (K, T) may be the number of PRBs from the non-preemptable macro-WTRU traffic observed in the UnSC K during time period T. For example, when the total load in a particular UnSC (e.g., M_RNsc(K, T)+M_DoUEsc(K, T)) is above a first threshold or below a second threshold, a donor cell Uu/Un subframe repartitioning may be triggered and/or a reconfiguration to a particular RN may be triggered. In an example, when M_RNsc(K, T) is above a first threshold or below a second threshold, a donor cell Uu/Un subframe repartitioning may be triggered and/or a reconfiguration to a particular RN may be triggered. For example, in the case of a congested UnSC associated with a particular RN, a trigger may prompt the DeNB to reconfigure the RN by assigning an additional UnSC(s) to the RN or to reconfigure the RN by assigning it a new UnSC and removing the existing UnSC from the RN.

Measurements may be performed for PRB usage per Un subframe configuration unit per traffic class (QCI). Measurements for RB usage per Un subframe configuration unit per traffic class may be performed separately for DL and UL. For example, a measurement for the macro-WTRU PRB usage on a particular UnSC K per traffic class/QCI (NI DoUEsc(K, T, qci)) may be performed. The macro-WTRU PRB usage over UnSC K per QCI may be determined by dividing the measured number of macro-WTRU PRBs for the traffic class qci on UnSC K for time period T (M1_DoUEsc(K, T, qci)) by the total number of PRBs available over UnSC K during time T (P_RNsc(K, T)). Equation (27) may represent the macro-WTRU PRB usage per UnSC unit per traffic class (QCI) over time period T.

$$M\_DoUEsc(K, T, qci) = \left\lfloor \frac{M1\_DoUEsc(K, T, qci)}{P\_RNsc(K, T)} * 100 \right\rfloor \quad \text{Equation (27)}$$

The macro-WTRU PRB usage per UnSC unit per traffic class (QCI) may be used for deriving the total load condition on an UnSC and/or may be used to predict the loading conditions due to the macro-WTRU traffic on other unassigned UnSCs, for example prior to a Un Subframe partition expansion.

In addition to monitoring the total RN traffic usage of the Un subframes (e.g., to assigned UnSC units), the RN PRB usage per QCI and/or the macro-WTRU PRB usage per QCI may also be measured on a per UnSC basis. The RN PRB usage per QCI per UnSC and/or the macro-WTRU PRB usage per QCI per UnSC may be measured in order to determine the load condition on a certain UnSC. The RN PRB usage per QCI per UnSC and/or the macro-WTRU PRB usage per QCI per UnSC may be performed separately for DL and UL. The RN PRB usage for QCI qci on UnSC K during time period T (M_RNsc(K, T, qci)) may be determined by dividing the total number of PRBs allocated to RNs in the UnSC K with QCI qci during time period T (M1_RNsc(K, T)) by the total number of available PRBs in the UnSC K during time period T (P_RNsc(K, T)). Equation (28) may represent the RN PRB usage per UnSC unit per traffic class (QCI) over time period T.

$$M\_RNsc(K, T, qci) = \left\lfloor \frac{M1\_RNsc(K, T, qci)}{P\_RNsc(K, T)} * 100 \right\rfloor \quad \text{Equation (28)}$$

In an example, rather than (or in addition to) utilizing the definition of RN PRB Usage per UnSC per QCI disclosed above, RN PRB Usage per UnSC per QCI may be determined by dividing the total number of RN PRBs in the UnSC K for QCI qci during timer period T (M1_RNsc(K, T, qci)) by the difference between the total number of PRBs in the UnSC K during timer period T (P_RNsc(K, T)) and the number of macro-WTRU PRBs observed in UnSC K during timer period T (M1_DoUEsc(K, T)). Equation (28) may represent the RN PRB usage per UnSC unit per traffic class (QCI) over time period T.

$$M\_RNsc(K, T, qci) = \left\lfloor \frac{M1\_RNsc(K, T, qci)}{P\_RNsc(K, T) - M1\_DoUEsc(K, T)} * 100 \right\rfloor \quad \text{Equation (28)}$$

In an example, rather than (or in addition to) utilizing the definition of RN PRB Usage per UnSC per QCI disclosed above, RN PRB Usage per UnSC per QCI may be determined by dividing the total number of RN PRBs in the UnSC K for QCI qci during timer period T (M1_RNsc(K, T, qci)) by the difference between the total number of PRBs in the UnSC K during timer period T (P_RNsc(K, T)) and the number of macro-WTRU PRBs for non-preemptable macro-WTRU traffic observed in the UnSC K during time period T (M2_DoUEsc(K, T)). Equation (29) may represent the RN PRB usage per UnSC unit per traffic class (QCI) over time period T.

$$M\_RNsc(K, T, qci) = \left\lfloor \frac{M1\_RNsc(K, T, qci)}{P\_RNsc(K, T) - M2\_DoUEsc(K, T)} * 100 \right\rfloor \quad \text{Equation (29)}$$

Measurements may be performed in order to determine the total macro-WTRU PRB usage. For example, a measurement of the total macro-WTRU PRB usage may be used to monitor the resource usage on a DeNB's Uu interface in order to detect the load condition on the DeNB/macro-WTRU interface. The measured results may be used for load balancing and/or congestion control at the DeNB. The measurement of the total macro-WTRU PRB usage may yield the percentage of total macro-WTRU PRB usage during time period T (M(T)). M(T)) may be determined by dividing the number of PRBs assigned to macro-WTRUs (M1(T)) by the total available PRB resources that may be used by macro-WTRUs during time period T (P(T)). P(T) may be defined as the maximum number of PRBs that could be assigned to macro-WTRUs during time period T. For example, the maximum number of PRBs that could be assigned to macro-WTRUs during time period T may be the difference of the total number of PRBs during time period T (A(T)) and the number of PRBs assigned to RN(s) during time period T (RN(T)). Equations (30) and (31) may represent the percentage of total macro-WTRU PRB usage during time period T and the maximum number of PRBs that could be assigned to macro-WTRUs during time period T, respectively.

$$M(T) = \left\lfloor \frac{M1(T)}{P(T)} * 100 \right\rfloor \quad \text{Equation (30)}$$

$$P(T) = A(T) - RN(T) \quad \text{Equation (31)}$$

The measurement may be performed separately for DL and UL. M(T) may be the total macro-WTRU PRB usage, which may be a percentage of PRBs actually used by macro-WTRUs, average over time period T. M(T) may range in value from 0-100%. M1(T) may be a count of full resource blocks assigned to macro-WTRUs during time period T. For the DL, PRBs used for transmission by macro-WTRUs may be included. For the UL, PRBs allocated to macro-WTRUs for transmission may be included. P(T) may be the total number of PRBs available for macro-WTRUs on the Uu interface of the DeNB during time period T. A(T) may be the total number of PRBs available during time period T. RN(T) may be the total number of PRBs used by RNs during time period T.

In an example, the total macro-WTRU PRB usage may be measure per traffic class (QCI). The measurement may yield the resource usage on DeNB-UE interface (e.g., the Uu interface) per traffic class. The total macro-WTRU PRB usage per traffic class may be expressed as M(qci), and may be the percentage of PRB usage pertaining to a traffic class of a macro-WTRU. The macro-WTRU PRB usage per traffic class measurement may be an aggregate the macro-WTRUs in a cell and may be applicable to Dedicated Traffic Channels (DTCH). The measurement may be performed at the Service Access Point between MAC and L1. The measurement may be performed separately for DL DTCH (e.g., for each QCI) and UL DTCH (e.g., for each QCI). Equation (32) may represent the absolute macro-WTRU PRB usage per traffic class qci during time period T. Equation (33) may represent macro-WTRU PRB usage per traffic class. Equation (34) may represent the maximum number of PRBs that could be allocated to macro-WTRUs during time period T.

$$M1(qci, T) = \sum_{\forall t} \sum_{\forall p \in S(t)} \frac{1}{W(p)} * X(t) * \frac{B(t, qci)}{B(t)} \quad \text{Equation (32)}$$

$$M(qci) = \left\lfloor \frac{M1(qci, T)}{P(T)} * 100 \right\rfloor \quad \text{Equation (33)}$$

$$P(T) = A(T) - RN(T) \quad \text{Equation (34)}$$

M1(qci, T) may be the number of PRBs assigned to macro-WTRUs per traffic class qci during time period T and may be a count of full or partial PRBs. The variable t may represent a transport block in time period T that contains STCH data over the DeNB-WTRU interface (e.g., the Uu interface). Transport blocks used for initial transmissions and HARQ retransmissions may be counted. S(T) may be the set of PRBs used for transmission of block t. W(p) may be the number of transport blocks that are currently sharing PRB p. B(t, qci) may be the total number of DTCH bits for RN DTCHs with a QCI of qci that are carried in transport block t and transmitted on the DeNB-WTRU interface (e.g., the Uu interface). X(t) may be defined to take multiplexing into account. For example, X(t) may be defined as X(t)=1 if multiplexing is taken into account. If multiplexing is not taken into account, X(t) may be defined as X(t)=1 if transport block t carries data corresponding to a single QCI. If multiplexing is not taken into account, X(t) may be defined as X(t)=0 if transport block t carries data corresponding to two or more QCI values. M(qci) may be the macro-WTRU PRB usage per traffic class and may be expressed as a percentage of PRBs used for QCI qci, averaged during time period T. M(qci) may range in value from 0-100%. P(T) may be the maximum number of PRBs that could be allocated for macro-WTRUs on the Uu interface of the DeNB during time period T. A(T) may be the total number of PRBs available during time period T. RN(T) may be the total number of PRBs used for RNs during time period T.

For self-organizing networks (SONs), an eNB may request the cell resource status of an RN cell. The RN maintaining the RN cell may communicate its wireless backhaul to a DeNB, and the DeNB may be a different base station than the requesting eNB. The requesting eNB may also request the cell resource status of the donor cell of the DeNB (e.g., the cell by which the wireless backhaul of the RN is communicated to the DeNB) since the capacity of the RN cell may be limited by the capacity of the donor cell and/or the capacity of the RN backhaul link. When a DeNB responds to the requesting DeNB with a Resource Update for the RN cell, the DeNB may indicate its donor cell identify. For example, the DeNB may send the donor cell E-UTRAN Cell Global Identifier (ECGI) to the requesting eNB. The DeNB may also send the Radio Resource Status for the RN backhaul link since the RN backhaul may also affect the capacity of the RN cell. To support the load conditions of a relay cell, requesting eNB may receive from the DeNB information related to the DeNB donor cell and the load associated with the RN backhaul in the donor cell. Table 1 provides examples of information elements that may be provided in a RN cell status update message sent from a DeNB to another eNB. For example, the cell status update message may include a Donor Cell ID and Un Interface Radio Resource Status.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ... ) | | YES | reject |
| eNB2 Measurement ID | M | | INTEGER (1 ... 4095, ... ) | | YES | reject |
| Cell Measurement Result | | 1 | | | YES | ignore |
| >Cell Measurement Result Item | | 1 to maxCellineNB | | | EACH | ignore |
| >>Cell ID | M | | ECGI 9.2.14 | | | |
| >>Donor Cell ID | O | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |

TABLE 1-continued

| IE/Group Name | Presence | Range | IE type and reference | Semantics description | Criticality | Assigned Criticality |
|---|---|---|---|---|---|---|
| >>UN interface Radio Resource Status | O | | 9.2.37 | | | |
| >>Composite Available Capacity Group | O | | 9.2.44 | | YES | ignore |

A measurement of the number of active WTRUs under a DeNB per traffic class/QCI may indicate the number of active WTRUs per QCI class. Since a DeNB may partition its resources between RNs and macro-WTRUs (e.g., time multiplex Uu and Un subframes), the DeNB may count the number of active macro-WTRUs per QCI excluding the WTRUs under the RN (e.g., RN-WTRUs). For example, if the DeNB is serving one or more RNs, the measurement may determine the number of active WTRUs per QCI connected directly to the DeNB, not WTRUs connected to the RN served by the DeNB. The measurement of the number of active macro-WTRUs may be performed macro-WTRUS active in the UL and/or macro-WTRUs active in the DL.

A measurement may be performed to determine the total number of active WTRUs under a RN in the DL per QCI. The DeNB may determine the number of active WTRUs under each RN and calculate the total number. For example, Equation (35) may represent the total number of active WTRUs in the DL that are connected to a RN served by the DeNB with QCI qci during time period T.

$$M(T, qci) = \sum_{\forall i} N(i, qci) \quad \text{Equation (35)}$$

M(T, qci) may be the number of active WTRUs in the DL per QCI connected to RNs attached to the DeNB, averaged during time period T. N(i, qci) may be the number of active WTRUs in the DL under RN(i) for a given QCI value of qci, where i may be an RN index number.

A measurement may be performed to determine the total number of active WTRUs under a RN in the UL per QCI. The DeNB may determine the number of active WTRUs under each RN and calculate the total number. For example, Equation (36) may represent the total number of active WTRUs in the UL that are connected to a RN served by the DeNB with QCI qci during time period T.

$$M(T, qci) = \sum_{\forall i} N(i, qci) \quad \text{Equation (36)}$$

M(T, qci) may be the number of active WTRUs in the UL per QCI connected to RNs attached to the DeNB, averaged during time period T. N(i, qci) may be the number of active WTRUs in the UL under RN(i) for a given QCI value of qci, where i may be an RN index number.

A determination of the average active WTRU bitrate may be ascertained by dividing the Cell PDCP SDU bit-rate (DL and/or UL) by the number of active WTRUs (DL and/or UL) for each QCI. If the Cell PDCP SDU bit-rate measurement includes the RN traffic at DeNB, then the number of active WTRUs measurement at DeNB may include both DeNB-WTRUs (e.g., macro-WTRUs) and RN-WTRUs. Since the averaged bitrate of Rn-WTRUs may be already calculated by RNs, it may be redundant if the DeNB includes RN-WTRUs into its calculation. In an example, to account for the possible double counting PDCP SDUs that are forwarded received from the X2/S1 to/from RN cell(s) may be deducted from the bit count in calculation of the Cell PDCP SDU bit-rate by the DeNB. In an example, the DeNB may count the DeNB-WTRUs (e.g., macro-WTRUs) in the measurement of the active WTRUs per QCI but not RN-WTRUs.

The DL packet delay measurement at a DeNB may measure the average packet delay per QCI class. The measured result may be used to guarantee/enforce the QoS on each QCI class. The delay on DeNB-RN interface (e.g., Un interface) may be the backhaul link for RNs, so the delay for these packets may be measured on Uu interface of the RN (e.g., the interface between the RN and WTRUs connected to the RN). Therefore, the packet delay measured at the DeNB may measure the delay on macro-WTRU packets (e.g., packets on the Uu interface of the DeNB), not packets on the Un interface of the DeNB. The measurement of the delay of RN backhaul packets may be performed in a separate measurement. Thus, if there are one or more RNs served in a cell, the DeNB may perform separate measurements for packets transmitted between the DeNB and the macro-WTRUs (e.g., packets on the Uu interface of the DeNB) and for packets transmitted between the DeNB and the one or more RNs (e.g., packets on the Un interface of the DeNB).

A measurement for macro-WTRU DL packet delay may indicate the average DL packet delay per QCI for macro-WTRUs (e.g., DL traffic on the DeNB Uu interface). DL packet delay per QCI on the Uu interface of a DeNB may refer to packet delay for macro-WTRU data radio bearers (DRBs). For the purposes of determining the delay, the reference point for the arrival of packets may be PDCP upper Service Access Point (SAP). The reference point for the reception of the packet may be the MAC lower SAP. In an example, the measurement of macro-WTRU DL packet delay may be performed separately per QCI. For example, Equation (37) may represent the DL packet delay for macro-WTRU packets over the Uu interface of the DeNB with QCI qci during time period T.

$$M(T, qci) = \left[ \frac{\sum_{\forall i} tAck(i) - tArriv(i)}{I(T)} \right] \quad \text{Equation (37)}$$

M(T, qci) may be the DL packet delay for macro-WTRUs (e.g., the packet delay on the Uu interface) per QCI, averaged during time period T. For example, the units for DL packet delay may be in terms of time, such as seconds or milliseconds. tArriv(i) may be the point in time when macro-WTRU PDCP Service Data Unit (SDU) i arrives. For example, the reference point for determining macro-WTRU PDCP SDU arrival may be the PDCP upper SAP. tAck(i) may be the point in time when the final portion of macro-WTRU PDCP SDU i was received by the WTRU according to HARQ feedback information. The index i may indicate a macro-WTRU SDU that arrives at the PDCP upper SAP during time period T. For example, if HARQ acknowledgement(s) are not received for all parts of a particular PDCP SDU, that PDCP SDU may be excluded in the determination of packet delay. I(T) may be the total number of macro-WTRU PDCP SDUs during the relevant measurement period T.

Similarly, a measurement for RN backhaul DL packet delay may correspond to the average DL packet delay per QCI for RN traffic (e.g., DL traffic on the DeNB Un interface). This measurement may be combined with measurements for RN processing and transmission delay to determine the total packet delay for RN packets. DL packet delay per QCI on the Un interface of a DeNB may refer to packet delay for RN data radio bearers (DRBs). For the purposes of determining the delay, the reference point for the arrival of packets may be PDCP upper Service Access Point (SAP). The reference point for the reception of the packet may be the MAC lower SAP. In an example, the measurement of RN DL packet delay may be performed separately per QCI. For example, Equation (38) may represent the DL packet delay for RN packets over the Un interface of the DeNB with QCI qci during time period T.

$$M\_RN(T, qci) = \left[ \frac{\sum_{\forall i} tAck(i) - tArriv(i)}{I(T)} \right]$$ Equation (38)

M_RN(T, qci) may be the DL packet delay for RNs (e.g., the packet delay on the Un interface) per QCI, averaged during time period T. For example, the units for DL packet delay may be in terms of time, such as seconds or milliseconds. tArriv(i) may be the point in time when RN PDCP Service Data Unit (SDU) i arrives. For example, the reference point for determining RN PDCP SDU arrival may be the PDCP upper SAP. tAck(i) may be the point in time when the final portion of RN PDCP SDU i was received by the RN according to HARQ feedback information. The index i may indicate an RN SDU that arrives at the PDCP upper SAP during time period T. For example, if HARQ acknowledgement(s) are not received for all parts of a particular PDCP SDU, that PDCP SDU may be excluded in the determination of packet delay. I(T) may be the total number of RN PDCP SDUs during the relevant measurement period T.

In an example, the measurement for RN backhaul DL packet delay per QCI may be performed on a per RN basis. By performing the measurement on a per RN basis, more detailed load and delay information may be obtained, since the relative delay between one or more RNs may be compared. DL Packet Delay per QCI per RN on the DeNB Un interface may measure packet delay for DRBs. For the purposes of determining the delay, the reference point for the arrival of packets may be PDCP upper Service Access Point (SAP). The reference point for the reception of the packet may be the MAC lower SAP. In an example, the measurement of RN DL packet delay may be performed separately per QCI. For example, Equation (39) may represent the DL packet delay for packets of RN j over the Un interface of the DeNB with QCI qci during time period T.

$$M\_RN(T, j, qci) = \left[ \frac{\sum_{\forall i} tAck(j, i) - tArriv(j, i)}{I(j, T)} \right]$$ Equation (39)

M_RN(T, j, qci) may be the DL packet delay for RN j (e.g., the packet delay on the Un interface between the DeNB and RN j) per QCI, averaged during time period T. For example, the units for DL packet delay may be in terms of time, such as seconds or milliseconds. tArriv(i) may be the point in time when PDCP Service Data Unit (SDU) i for RN j arrives. For example, the reference point for determining RN PDCP SDU arrival may be the PDCP upper SAP. tAck(i) may be the point in time when the final portion of PDCP SDU i for RN j was received by the RN j according to HARQ feedback information. The index i may indicate an SDU for RN j that arrives at the PDCP upper SAP during time period T. For example, if HARQ acknowledgement(s) are not received for all parts of a particular PDCP SDU, that PDCP SDU may be excluded in the determination of packet delay. I(T) may be the total number of PDCP SDUs for RN j during the relevant measurement period T.

To accurately determine full packet delay for RN-WTRUs, a measurement for packet processing and transmission delay in the RN may be performed to determine the processing and transmission delay per QCI in the RN. The RN packet processing and transmission delay measurement may indicate the average delay between the time the RN $MAC_{WTRU}$ receives the packet from the DeNB on its Un interface and the time the RN $MAC_{eNB}$ receives an ACK from the RN-WTRU on its Uu interface. This measurement may be combined with DeNB backhaul delay to determine the total DL average delay for RN-WTRU packets from the DeNB's PDCP upper SAP to the RN-WTRU. For example, an estimation of total packet delay per traffic class under the RN from the sender to receiver may be used for the network QoS management. The estimation of total packet delay may be determined by combining the total DL average delay for RN-WTRU packets with the average network packet delay. A DL Packet Delay per QCI measurement may refer to packet delay for DRBs. For the purposes of determining the delay, the reference point for the arrival of packets may be the RN MAC lower SAP on the Un interface. The reference point for the reception of the packet may be the RN MAC lower SAP on the RN Uu interface. In an example, the measurement of packet processing and transmission delay in the RN may be performed separately per QCI. For example, Equation (40) may represent the DL packet processing and transmission delay in the RN with QCI qci during time period T.

$$M(T, qci) = \left[ \frac{\sum_{\forall i} tAck(i) - tArriv(i)}{I(T)} \right]$$ Equation (40)

M(T, qci) may be the DL packet delay in the RN per QCI, averaged during time period T. For example, the units for DL packet delay may be in terms of time, such as seconds or milliseconds. tArriv(i) may be the point in time when MAC receives MAC SDU i from the DeNB on the Un interface. tAck(i) may be the point in time when the final portion of SDU i was received by the RN-WTRU according to HARQ feedback information. The index i may indicate an SDU that arrives at the MAC layer of the RN via its Uu interface during time period T. I(T) may be the total number of MAC SDUs during the relevant measurement period T.

A DL data discard measurement at a DeNB may measure the packet drop rate as an indicator of the congestion level of a given cell. At a DeNB, to reflect the congestion possible on the DeNB-RN interface (e.g., the Un interface) and DeNB macro-WTRU interface (e.g., the Uu interface) two measurements may be performed to separately determine the congestion levels on the Uu interface and the Un interface.

For example, a measurement of DL data discard at the DeNB for macro-WTRUs may be performed to determine the packet discard ratio of DL macro-WTRU packets. A DL Packet Discard Rate per QCI measurement on the DeNB Uu interface may indicate the discard rate for macro-WTRU DRBs. For example, a packet may correspond to one macro-WTRU PDCP SDU. The reference point for performing the measurement may be PDCP upper SAP. The measurement may be performed separately for each QCI. For example, Equation (41) may represent the DL packet discard rate on the Uu interface for packets with QCI qci during time period T.

$$M\_ue(T, qci) = \left\lfloor \frac{Ddisc\_ue(T, qci) * 1000000}{N\_ue(T, qci)} \right\rfloor \quad \text{Equation (41)}$$

In many scenarios, packet loss may be very small. The statistical accuracy of an individual discard rate measurement result may be dependent on how many packets have been received, and thus the time for the measurement. M_ue(T, qci) may be the DL macro-WTRU packet discard rate per QCI, averaged during time period T. The units for DL macro-WTRU packet discard rate may be a number of packets discarded for every n packets. For example, n may be $10^6$ packets. Ddiscue(T, qci) may be the number of DL macro-WTRU packets for which no part has been transmitted over the air and that are discarded in the PDCP, RLC, or MAC layers due to a reason other than handover and include data of a radio bearer with a QCI of qci, during time period T. N_ue(T, qci) may be the number of DL macro-WTRU packets of a bearer with a QCI of qci that has arrived at the PDCP upper SAP during time period T. For example, T may be measured in minutes.

Similarly, a measurement of DL data discard at the DeNB for RN traffic may be performed to determine the packet discard ratio of DL RN packets. A DL Packet Discard Rate per QCI measurement on the DeNB Un interface may indicate the discard rate for RN DRBs. For example, a packet may correspond to one RN PDCP SDU. The reference point for performing the measurement may be PDCP upper SAP. The measurement may be performed separately for each QCI. For example, Equation (42) may represent the DL packet discard rate on the Un interface for packets with QCI qci during time period T.

$$M\_RN(T, qci) = \left\lfloor \frac{Ddisc\_RN(T, qci) * 1000000}{N\_RN(T, qci)} \right\rfloor \quad \text{Equation (42)}$$

In many scenarios, packet loss may be very small. The statistical accuracy of an individual discard rate measurement result may be dependent on how many packets have been received, and thus the time for the measurement. M_RN(T, qci) may be the DL RN packet discard rate per QCI, averaged during time period T. The units for DL RN packet discard rate may be a number of packets discarded for every n packets. For example, n may be $10^6$ packets. Ddisc_RN(T, qci) may be the number of DL RN packets for which no part has been transmitted over the PDCP, RLC, or MAC layers due to a reason other than handover and include data of a radio bearer with a QCI of qci, during time period T. N_RN(T, qci) may be the number of DL RN packets of a bearer with a QCI of qci that has arrived at the PDCP upper SAP during time period T. For example, T may be measured in minutes.

In an example, the DL data discard at the DeNB for RN traffic for a given traffic class may be measured on a per RN basis. For example, a measurement of DL Packet Discard Rate per QCI for RN station j on the DeNB Un interface may indicate the discard rate for RN station j DRBs. For example, a packet may correspond to one RN PDCP SDU. The reference point for performing the measurement may be PDCP upper SAP. The measurement may be performed separately for each QCI. For example, Equation (43) may represent the DL packet discard rate on the Un interface for packets with QCI qci during time period T.

$$M\_RN(T, j, qci) = \left\lfloor \frac{Ddisc\_RN(T, j, qci) * 1000000}{N\_RN(T, j, qci)} \right\rfloor \quad \text{Equation (43)}$$

In many scenarios, packet loss may be very small. The statistical accuracy of an individual discard rate measurement result may be dependent on how many packets have been received, and thus the time for the measurement. M_RN(T, j, qci) may be the DL RN packet discard rate per QCI for RN station j, averaged during time period T. The units for DL RN packet discard rate may be a number of packets discarded for every n packets. For example, n may be $10^6$ packets. Ddisc_RN(T, j, qci) may be the number of DL RN packets for RN station j for which no part has been transmitted over the air and that are discarded in the PDCP, RLC, or MAC layers due to a reason other than handover and include data of a radio bearer with a QCI of qci, during time period T. N_RN(T, j, qci) may be the number of DL RN packets of a bearer with a QCI of qci for RN station j that has arrived at the PDCP upper SAP during time period T. For example, T may be measured in minutes.

In order to ascertain a detailed model of the radio transmission conditions at the DeNB, separate measurements of DeNB macro-WTRU packet loss (e.g., packet loss associated with the Uu interface) and DeNB-RN packet loss (e.g., packet loss associated with the un interface). The measurements may apply to some types and/or all types of relays.

A measurement for DL packet loss rate per QCI on the Uu interface may measure the DL data loss rate of macro-WTRU packets for each QCI class. For example, a packet may correspond to one macro-WTRU PDCP SDU. The measurement may be performed separately for each QCI. The reference point for performing the measurement may be PDCP upper SAP. For example, Equation (44) may represent the DL packet loss rate on the Uu interface for packets with QCI qci during time period T.

$$M(T, qci) = \left\lfloor \frac{Dloss(T, qci) * 1000000}{N(T, qci) + Dloss(T, qci)} \right\rfloor \quad \text{Equation (44)}$$

For example, the packet loss may be expected to be upper bounded by the packet error loss rate (PELR) of the QCI, which may take a value between $10^{-6}$ and $10^{-2}$. The statistical accuracy of an individual packet loss rate measurement result may be dependent on how many packets have been received, and thus the time allowed for the measurement. M(T, qci) may be the DL packet loss rate per QCI on the Uu interface, averaged during time period T. The units for DL packet loss rate may be a number of packets discarded for every n packets. For example, n may be $10^6$ packets. Dloss(T, qci) may be the number of DL packets on the Uu interface with a QCI of qci for which at least a part has been transmitted over the air but has not been positively acknowledged, and for which during time period T it was determined that no further transmission attempts will be performed. For example, if transmission of a packet might continue in another cell, it may be excluded from the count. N(T, qci) may be the number of DL macro-WTRU packets of a bearer with a QCI of qci that has been transmitted over the air and has been positively acknowledged during time period T. For example, T may be measured in minutes.

Similarly, a measurement for DL packet loss rate per QCI on the Un interface may measure the DL data loss rate of RN packets for each QCI class. For example, a packet may correspond to one RN PDCP SDU. The measurement may be performed separately for each QCI. The reference point for performing the measurement may be PDCP upper SAP. For example, Equation (45) may represent the DL packet loss rate on the Un interface for packets with QCI qci during time period T.

$$M\_RN(T, qci) = \left\lfloor \frac{Dloss\_RN(T, qci) * 1000000}{N\_RN(T, qci) + Dloss\_RN(T, qci)} \right\rfloor \quad \text{Equation (45)}$$

For example, the packet loss may be expected to be upper bounded by the packet error loss rate (PELR) of the QCI, which may take a value between $10^{-6}$ and $10^{-2}$. The statistical accuracy of an individual packet loss rate measurement result may be dependent on how many packets have been received, and thus the time allowed for the measurement. M_RN(T, qci) may be the DL packet loss rate per QCI on the Un interface, averaged during time period T. The units for DL packet loss rate may be a number of packets discarded for every n packets. For example, n may be $10^6$ packets. Dloss_RN(T, qci) may be the number of DL packets on the Un interface with a QCI of qci for which at least a part has been transmitted over the air but has not been positively acknowledged, and for which during time period T it was determined that no further transmission attempts will be performed. For example, if transmission of a packet might continue in another cell, it may be excluded from the count. N(T, qci) may be the number of DL RN packets of a bearer with a QCI of qci that has been transmitted over the air and has been positively acknowledged during time period T. For example, T may be measured in minutes.

In an example, the measurement for DL packet loss rate per QCI on the Un interface may be performed on a per RN basis. For example, a measurement of the DL Packet Loss Rate per QCI for a given RN station J may measure to packet loss for DRBs of RN station J. A packet may correspond to one RN PDCP SDU. The measurement may be performed separately for each QCI. The reference point for performing the measurement may be PDCP upper SAP. For example, Equation (46) may represent the DL packet loss rate for RN station J on the Un interface for packets with QCI qci during time period T.

$$M\_RN(T, J, qci) = \left\lfloor \frac{Dloss\_RN(T, J, qci) * 1000000}{N\_RN(T, J, qci) + Dloss\_RN(T, J, qci)} \right\rfloor \quad \text{Equation (46)}$$

For example, the packet loss may be expected to be upper bounded by the packet error loss rate (PELR) of the QCI, which may take a value between $10^{-6}$ and $10^{-2}$. The statistical accuracy of an individual packet loss rate measurement result may be dependent on how many packets have been received, and thus the time allowed for the measurement. M_RN(T, J, qci) may be the DL packet loss rate for RN station J per QCI on the Un interface, averaged during time period T. The units for DL packet loss rate may be a number of packets discarded for every n packets. For example, n may be $10^6$ packets. Dloss_RN(T, J, qci) may be the number of DL packets for RN station J on the Un interface with a QCI of qci for which at least a part has been transmitted over the air but has not been positively acknowledged, and for which during time period T it was determined that no further transmission attempts will be performed. For example, if transmission of a packet might continue in another cell, it may be excluded from the count. N(T, J, qci) may be the number of DL RN packets of a bearer with a QCI of qci for RN station J that has been transmitted over the air and has been positively acknowledged during time period T. For example, T may be measured in minutes.

A measurement for UL packet loss rate per QCI on the Uu interface may measure the UL data loss rate of macro-WTRU packets for each QCI class. For example, a packet may correspond to one macro-WTRU PDCP SDU. The measurement may be performed separately for each QCI. The reference point for performing the measurement may be PDCP upper SAP. For example, Equation (47) may represent the UL packet loss rate on the Uu interface for packets with QCI qci during time period T.

$$M(T, qci) = \left\lfloor \frac{Dloss(T, qci) * 1000000}{N(T, qci)} \right\rfloor \quad \text{Equation (47)}$$

For example, the packet loss may be expected to be upper bounded by the packet error loss rate (PELR) of the QCI, which may take a value between $10^{-6}$ and $10^{-2}$. The statistical accuracy of an individual packet loss rate measurement result may be dependent on how many packets have been received, and thus the time allowed for the measurement. M(T, qci) may be the UL packet loss rate per QCI on the Uu interface, averaged during time period T. The units for UL packet loss rate may be a number of packets discarded for every n packets. For example, n may be $10^6$ packets. Dloss(T, qci) may be the number of missing macro-WTRU UL PDCP sequence numbers during time period T, which may correspond to the number of UL PDCP packets on the Uu interface that are not delivered to higher layers and are of a data radio bearer with a QCI of qci. For example, if transmission of a packet might continue in another cell, that packet may be excluded from the count. N(T, qci) may be the total number of macro-WTRU UL PDCP sequence numbers (including missing sequence numbers) of a bearer with a QCI of qci, beginning with the first packet delivered by the PDCP upper SAP to higher layers and ending at the PDCP SN of the last packet of time period T. For example, T may be measured in minutes.

Similarly, a measurement for UL packet loss rate per QCI on the Un interface may measure the UL data loss rate of RN packets for each QCI class. For example, a packet may correspond to one RN PDCP SDU. The measurement may be performed separately for each QCI. The reference point for performing the measurement may be PDCP upper SAP. For example, Equation (48) may represent the UL packet loss rate on the Un interface for packets with QCI qci during time period T.

$$M\_RN(T, qci) = \left\lfloor \frac{Dloss\_RN(T, qci) * 1000000}{N\_RN(T, qci)} \right\rfloor \quad \text{Equation (48)}$$

For example, the packet loss may be expected to be upper bounded by the packet error loss rate (PELR) of the QCI, which may take a value between $10^{-6}$ and $10^{-2}$. The statistical accuracy of an individual packet loss rate measurement result may be dependent on how many packets have been received, and thus the time allowed for the measurement. M_RN(T, qci) may be the UL packet loss rate per QCI on the Un interface, averaged during time period T. The units for UL packet loss rate may be a number of packets discarded for every n packets. For example, n may be $10^6$ packets. Dloss_RN(T, qci) may be the number of missing RN UL PDCP sequence numbers during time period T, which may correspond to the number of UL PDCP packets on the Un interface that are not delivered to higher layers and are of a data radio bearer with a QCI of qci. For example, if transmission of a packet might continue in another cell, that packet may be excluded from the count. N_RN(T, qci) may be the total number of RN UL PDCP sequence numbers (including missing sequence numbers) of a bearer with a QCI of qci, beginning with the first packet delivered by the PDCP upper SAP to higher layers and ending at the PDCP SN of the last packet of time period T. For example, T may be measured in minutes.

In an example, measurement for UL packet loss rate per QCI on the Un interface may be performed on a per RN basis. For example, a measurement of UL packet loss rate per QCI on the Un interface for RN station J may measure UL packet loss for DRBs of RN station J that have a QCI of qci. For example, a packet may correspond to one PDCP SDU for RN station J. The measurement may be performed separately for each QCI. The reference point for performing the measurement may be PDCP upper SAP. For example, Equation (49) may represent the UL packet loss rate on the Un interface for packets with QCI qci during time period T.

$$M\_RN(T, J, qci) = \left\lfloor \frac{Dloss\_RN(T, J, qci) * 1000000}{N\_RN(T, J, qci)} \right\rfloor \quad \text{Equation (49)}$$

For example, the packet loss may be expected to be upper bounded by the packet error loss rate (PELR) of the QCI, which may take a value between $10^{-6}$ and $10^{-2}$. The statistical accuracy of an individual packet loss rate measurement result may be dependent on how many packets have been received, and thus the time allowed for the measurement. M_RN(T, J, qci) may be the UL packet loss rate per QCI on the Un interface for RN station J, averaged during time period T The units for UL packet loss rate may be a number of packets discarded for every n packets. For example, n may be $10^6$ packets. Dloss_RN(T, J, qci) may be the number of missing RN UL PDCP sequence numbers for RN station J during time period T, which may correspond to the number of UL PDCP packets on the Un interface that are not delivered to higher layers and are of a data radio bearer with a QCI of qci. For example, if transmission of a packet might continue in another cell, that packet may be excluded from the count. N_RN(T, J, qci) may be the total number of RN UL PDCP sequence numbers (including missing sequence numbers) of a bearer with a QCI of qci for RN station J, beginning with the first packet delivered by the PDCP upper SAP to higher layers and ending at the PDCP SN of the last packet of time period T. For example, T may be measured in minutes.

Figure 4:
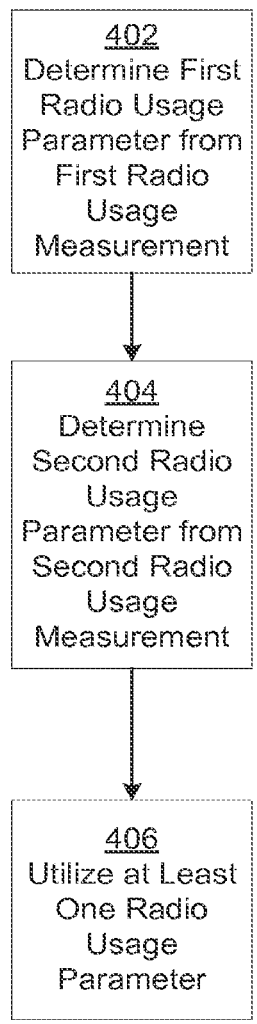
FIG. 4 is a flow chart illustrating an example method for performing radio usage measurements.

FIG. 4 is a flow chart for an example method for performing radio usage measurements to support radio link operations and/or load balancing is disclosed herein. At 402, a device such as a eNB may determine a first radio usage parameter. The first radio usage parameter may be a measurement of radio usage between the eNB and at least one WTRU. The first radio usage measurement may be a Layer 2 (L2) measurement for traffic on a Uu interface of the eNB. The eNB may be a DeNB. At 404, the eNB may determine a second radio usage parameter. The second radio usage parameter may be a measurement of radio usage between the eNB and at least one RN served by the eNB. The second radio usage measurement may be an L2 measurement for traffic on a Un interface of the DeNB. At 406, the eNB may utilize at least one of the first radio usage parameter or the second radio usage parameter to evaluate at least one of evolved universal terrestrial radio access (E-UTRA) radio link operations (e.g., support Uu interface and/or Un interface operation), radio resource management (RRM) (e.g., repartitioning of Uu and/or Un radio resources), network operations and maintenance (OAM) (e.g., for OAM performance observability), and self-organizing networks (SON) functions or functionalities (e.g., RN/WTRU handover and/or RN connection maintenance). Utilizing at least one of the first radio usage parameter or the second radio usage parameter may comprise sending at least one of the first radio usage parameter or the second radio usage parameter to the E-UTRA network. A node in the E-UTRAN network may make performance decisions based on the parameter provided by the eNB.

The measurements may be one or more of the L2 measurements described herein. Example L2 measurements that may be performed on at least one of a Uu interface or Un interface may include, but are not limited to, one or more of: downlink (DL) physical resource block (PRB) usage, uplink (UL) PRB usage, DL PRB usage per Quality of Service (QoS) class indicator (QCI), UL PRB usage per QCI, actual total load condition, PRB usage per Un Subframe Configuration (UnSC), macro-WTRU PRB usage in Un subframes, RN PRB usage in Un subframes, other measurements indicating PRB usage at the DeNB, an estimation of the number of active WTRUs under a DeNB per QCI, DL packet delay measurements, DL data discard measurements, DL data loss measurements, or UL data loss measurements. Packet processing and transmission delay measurements may be performed at the RN. Measurements performed at the RN may be signaled to the DeNB.

Figure 5:
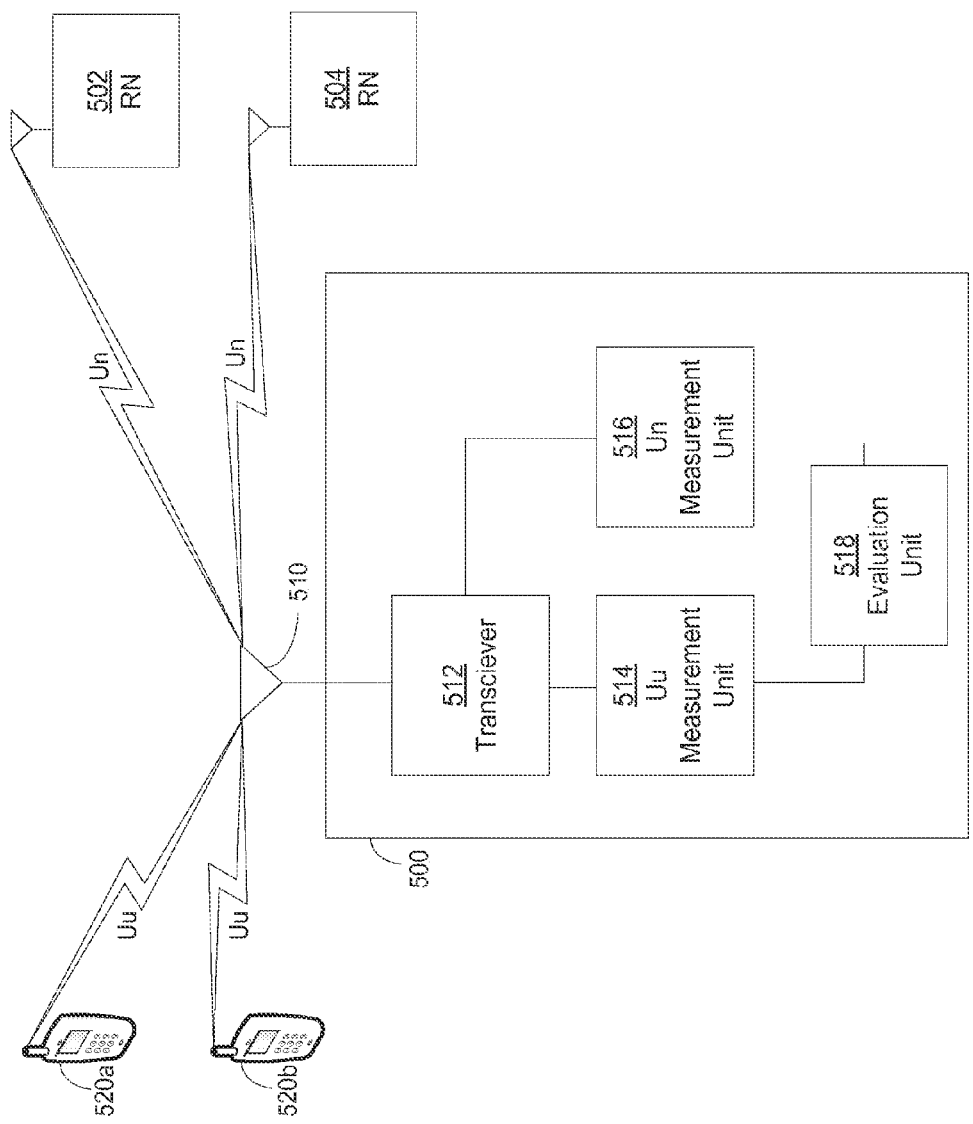
FIG. 5 is a block diagram of an example system for performing layer two measurements.

FIG. 5 illustrates an example of an eNB configured to perform layer two measurements. In an example, eNB 500 may include one or more antennas 510. One or more antennas 510 may be coupled to transceiver 512. Messages and signals from WTRU 520*a*, WTRU 520*b*, RN 502, and/or RN 504 may be received by eNB 500 via one or more antennas 510 and transceiver 512. Uu Measurement Unit 514 may be coupled to transceiver 512. Un Measurement Unit 516 may be coupled to Transceiver 512. Uu Measurement Unit 514 may be configured to perform a first radio usage measurement. The first radio usage measurement may measure radio usage between eNB 500 and at least of one of WTRU 520*a* and/or WTRU 520*b*. Un Measurement Unit 516 may be configured to perform a second radio usage measurement. The second radio usage measurement may measure radio usage between eNB 500 and at least one of RN 502 and/or RN 504. As may be appreciated more or less WTRUs and/or RNs may be served by eNB 500, and eNB 500 may perform measurements on more or less WTRUs/RNs. Evaluation Unit 518 may be coupled to Uu Measurement Unit 514 and Un Measurement Unit 516. Evaluation Unit 518 may be configured to utilize each of the first radio measurement and the second radio measurement to perform at least one of cell load balancing, repartitioning radio resources, call admission control, or congestion control. In an example, Uu Measurement Unit 514, Un Measurement Unit 516, and/or Evaluation Unit 518 may be implemented in a processor configured to perform and/or evaluate measurements.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for handing over a relay node (RN) from a source evolved Node B (eNB) to a target eNB, the method comprising:
   the source eNB determining to handover the RN to the target eNB;
   the source eNB sending a handover command to the RN, the handover command indicating that the RN is to handover from the source eNB to the target eNB; and
   the source eNB sending bearer context information to the target eNB, wherein the bearer context information comprises information that allows the target eNB to accept the RN while at least one wireless transmit/receive unit (WTRU) connected to the RN remains in the connected state throughout the handover.

2. The method of claim 1, further comprising:
   the source eNB sending a handover request message to the target eNB; and
   the source eNB receiving a handover acceptance message from the target eNB, wherein the handover acceptance message includes a handover parameter, wherein the handover parameter is included in the handover command.

3. The method of claim 2, wherein the handover parameter comprises at least one of a Un subframe configuration or synchronization and timing information.

4. The method of claim 1, wherein determining to handover the RN is based on at least one of measurements performed by the source eNB or message received from a mobility management entity (MME).

5. The method of claim 1, further comprising the source eNB receiving a donor eNB (DeNB) list for the RN and selecting the target eNB based on the DeNB list.

6. The method of claim 1, wherein the handover command comprises a dedicated Random Access Channel Preamble for the RN.

7. A relay node comprising:
   a first physical layer entity configured to communicate with one or more wireless transmit/receive unit (WTRU) over a Uu interface;
   a second physical layer entity configured to communicate with one or more evolved Node B (eNBs) over a Un interface; and
   a processor configured to:
      perform one or more Layer 2 (L2) measurements for one or more of the Un interface or the Uu interface,
      send the one more L2 measurements to a source donor eNB (DeNB),
      receive an RRCRNReconfiguration message from the source DeNB, the RRCRNReconfiguration message comprising an indication that the relay node is to handover to a target DeNB and Un interface configuration information for communicating with the target DeNB, and
      perform a handover from the source DeNB to the target DeNB while at least one WTRU connected to the relay node via the Uu interface remains in a connected state during the handover.

8. The relay node of claim 7, wherein the RRCRNReconfiguration message further comprises an indication that the relay node is to perform a tracking area update procedure (TAU) upon handing over to the target DeNB.

9. The relay node of claim 8, wherein the relay node being handed over to the target DeNB results in the relay node entering a new tracking area that is associated with a different mobility management entity (MME) than a MME that served the relay node when the relay node was connected to the source DeNB.

10. The relay node of claim 7, wherein each WTRU that was connected to the relay node prior to the handover remains connected to the relay node after the handover.

11. The relay node of claim 7, wherein a subset of WTRUs that were connected to the relay node prior to the handover remain connected to the relay node after the handover.

12. The relay node of claim 11, wherein the subset of WTRUs share a common quality of service (QoS) characteristic.

13. The relay node of claim 11, wherein the processor is further configured to handover at least a first WTRU that was connected to the relay node to the source DeNB prior to completing the handover to the target DeNB.

14. The relay node of claim 13, wherein at least the first WTRU was rejected by the target DeNB.

15. The relay node of claim 7, wherein the processor is further configured to perform load balancing for WTRUs connected to the relay node based on receiving a command from one or more of the source DeNB, the target DeNB, or a mobility management entity.

16. The relay node of claim 7, wherein during a random access channel (RACH) procedure for the handover, the processor is configured to utilize a dedicated random access preamble associated with a Un subframe configuration to be utilized with the target DeNB.

17. The relay node of claim 16, wherein the dedicated random access preamble is indicated by the RRCRNReconfiguration message.

18. A method implemented by a relay node (RN), the method comprising:
   the RN communicating with one or more wireless transmit/receive unit (WTRU) over a Uu interface;
   the RN communicating with one or more evolved Node B (eNBs) over a Un interface;
   the RN performing one or more Layer 2 (L2) measurements for one or more of the Un interface or the Uu interface;
   the RN sending the one more L2 measurements to a source donor eNB (DeNB);

the RN receiving an RRCRNReconfiguration message from the source DeNB, the RRCRNReconfiguration message comprising an indication that the relay node is to handover to a target DeNB and Un interface configuration information for communicating with the target DeNB; and the RN performing a handover from the source DeNB to the target DeNB while at least one WTRU connected to the relay node via the Uu interface remains in a connected state during the handover.

19. The method of claim 18, wherein further comprising the RN handing over, to the source DeNB, at least a first WTRU that was connected to the RN prior to completing the handover to the target DeNB.

20. The method of claim 19, wherein at least the first WTRU was rejected by the target DeNB.

* * * * *